US006560581B1

(12) United States Patent
Fox et al.

(10) Patent No.: US 6,560,581 B1
(45) Date of Patent: *May 6, 2003

(54) SYSTEM AND METHOD FOR SECURE ELECTRONIC COMMERCE TRANSACTION

(75) Inventors: Barbara L. Fox, Seattle, WA (US); Lester L. Waters, Bellevue, WA (US); Jeffrey F. Spelman, Duvall, WA (US); Robert B. Seidensticker, Woodinville, WA (US); Matthew W. Thomlinson, Bellevue, WA (US)

(73) Assignee: Visa International Service Association, Foster City, CA (US)

( * ) Notice: Subject to any disclaimer, the term of this patent is extended or adjusted under 35 U.S.C. 154(b) by 0 days.
This patent is subject to a terminal disclaimer.

(21) Appl. No.: 09/093,436
(22) Filed: Jun. 8, 1998

Related U.S. Application Data

(63) Continuation of application No. 08/496,830, filed on Jun. 29, 1995, now Pat. No. 5,790,677.

(51) Int. Cl.$^7$ ............................................... G06F 17/60
(52) U.S. Cl. ....................... 705/51; 705/1; 705/26; 705/6 H; 705/71; 705/75; 705/78; 380/45
(58) Field of Search .................................. 705/1, 26, 27, 705/40, 64, 71, 78, 75, 67, 72, 74, 76, 51, 52, 53; 380/21, 24, 23, 30, 25, 45

(56) References Cited

U.S. PATENT DOCUMENTS 4,305,059 A  12/1981  Benton ................... 340/825.33

(List continued on next page.)

FOREIGN PATENT DOCUMENTS

EP          0 325 564 A1   7/1989   ............. H04N/1/00

(List continued on next page.)

OTHER PUBLICATIONS

Rubin, Aviel D., "Secure Distribution of Electronic Documents in a Hostile Environment", Computer Communications, Elsevier Science Publishers, Amsterdam, vol. 18, No. 6, pp. 429–434, Jun. 1, 1995.*

(List continued on next page.)

*Primary Examiner*—John W. Hayes
(74) *Attorney, Agent, or Firm*—Townsend and Townsend and Crew LLP

(57) ABSTRACT

An electronic commerce system facilitates secure electronic commerce transactions among multiple participants. Each electronic commerce transaction involves at least one commerce document defining the transaction and at least one commerce instrument defining a payment for the transaction. The electronic commerce system has a credential binding server at a trusted credential authority, multiple computing units at associated participants, and a communication system interconnecting the credential binding server and the multiple computing units. The electronic commerce system operates in two phases: a registration phase and a transaction phase. During the registration phase, each of the computing units generate and send a registration packet over the communication system to the credential binding server. Unique credentials are produced by the credential binding server based upon the registration packets sent back to the computing units. During the transaction phase, an originating computing unit initially requests, receives, and verifies the credentials of expected recipient computing units to ensure communication between authenticate participants. Thereafter, the originating computing unit signs and encrypts the commerce document(s) and the commerce instrument(s) in a manner which ensures that only the intended recipients can decrypt them. The originating computing unit then sends both the commerce document(s) and instrument(s) over the communication system to a first recipient computing unit. The first recipient computing unit decrypts and verifies the commerce document (s) and/or instruments intended for it. The first recipient computing unit then passes the balance of the encrypted commerce document(s) and/or instrument(s) over the communication system to a second recipient computing unit, which decrypts and verifies the commerce document(s) and/or instrument(s) intended for it. This process is continued until all commerce documents and commerce instruments are distributed, decrypted, and verified by their intended recipients.

26 Claims, 23 Drawing Sheets

U.S. PATENT DOCUMENTS

| | | | |
|---|---|---|---|
| 4,578,530 A | 3/1986 | Zeidler | 178/22.09 |
| 4,734,858 A | 3/1988 | Schlafly | 364/408 |
| 4,755,940 A | 7/1988 | Brachtl et al. | 364/408 |
| 4,775,935 A | 10/1988 | Yourick | 364/401 |
| 4,795,890 A | 1/1989 | Goldman | 235/380 |
| 4,799,156 A | 1/1989 | Shavit et al. | 364/401 |
| 4,812,628 A | 3/1989 | Boston et al. | 235/380 |
| 4,827,508 A | 5/1989 | Shear | 380/4 |
| 4,876,592 A | 10/1989 | Von Kohorn | 358/84 |
| 4,922,521 A | 5/1990 | Krikke et al. | 379/95 |
| 4,935,870 A | 6/1990 | Burk, Jr. et al. | 364/200 |
| 4,947,028 A | 8/1990 | Gorog | 235/381 |
| 4,977,595 A | 12/1990 | Ohta et al. | 380/24 |
| 4,982,346 A | 1/1991 | Girouard et al. | 364/550 |
| 4,992,940 A | 2/1991 | Dworkin | 364/401 |
| 5,025,373 A | 6/1991 | Keyser, Jr. et al. | 364/408 |
| 5,060,153 A | 10/1991 | Nakagawa | 364/405 |
| 5,077,607 A | 12/1991 | Johnson et al. | 358/86 |
| 5,220,501 A | 6/1993 | Lawlor et al. | 364/408 |
| 5,247,575 A | 9/1993 | Sprague et al. | 380/9 |
| 5,251,324 A | 10/1993 | McMullan, Jr. | 405/2 |
| 5,305,195 A | 4/1994 | Murphy | 364/401 |
| 5,311,594 A | 5/1994 | Penzias | 380/23 |
| 5,321,751 A | 6/1994 | Ray et al. | 395/200 |
| 5,336,870 A | 8/1994 | Hughes | 235/379 |
| 5,341,429 A | 8/1994 | Stringer et al. | 380/23 |
| 5,347,632 A | 9/1994 | Filepp et al. | 395/200 |
| 5,351,186 A | 9/1994 | Bullock et al. | 364/401 |
| 5,351,293 A | 9/1994 | Michener | 380/44 |
| 5,383,113 A | 1/1995 | Kight et al. | 364/401 |
| 5,414,833 A | 5/1995 | Hershey et al. | 395/575 |
| 5,420,926 A * | 5/1995 | Low et al. | 705/74 |
| 5,557,518 A * | 9/1996 | Rosen | 705/69 |
| 5,590,197 A * | 12/1996 | Chen et al. | 705/65 |
| 5,596,642 A | 1/1997 | Davis et al. | 380/24 |
| 5,596,643 A | 1/1997 | Davis et al. | 380/24 |
| 5,604,802 A | 2/1997 | Holloway | 380/24 |
| 5,621,797 A | 4/1997 | Rosen | 380/24 |
| 5,623,547 A | 4/1997 | Jones et al. | 380/24 |
| 5,642,419 A | 6/1997 | Rosen | 380/23 |
| 5,790,677 A * | 8/1998 | Fox et al. | 380/24 |
| 5,826,241 A * | 10/1998 | Stein et al. | 705/26 |
| 6,205,437 B1 * | 3/2001 | Gifford | 705/75 |

FOREIGN PATENT DOCUMENTS

| | | | | |
|---|---|---|---|---|
| EP | 0 344 672 A1 | 12/1989 | | G09F/27/00 |
| EP | 0 410 036 A1 | 1/1991 | | G06F/14/40 |
| EP | 0 426 542 | 5/1991 | | H04H/9/00 |
| EP | 0 446 500 A1 | 9/1991 | | G06F/15/24 |
| EP | 0 479 982 B1 | 4/1992 | | G07F/7/10 |
| EP | 0 512 702 A2 | 11/1992 | | G06F/15/21 |
| EP | 0 584 454 A1 | 3/1994 | | G06F/15/21 |
| EP | 0416 482 B1 | 11/1995 | | G07F/7/10 |
| EP | 0 729 246 A1 | 8/1996 | | H04H/9/00 |
| EP | 0 200 343 B2 | 12/1996 | | G07F/7/08 |
| EP | 0 779 587 A2 | 6/1997 | | G06F/18/60 |
| EP | 0 793 186 A2 | 9/1997 | | G06F/19/00 |
| EP | 0 817 414 A2 | 1/1998 | | H04H/9/00 |
| EP | 0 822 535 A2 | 2/1998 | | G09F/27/00 |
| EP | 0 833 469 A1 | 4/1998 | | H04H/9/00 |
| EP | 1 065 634 A1 * | 1/2001 | | |
| GB | 1 293 259 | 10/1972 | | G07B/11/02 |
| GB | 2 102 606 A | 2/1983 | | |
| GB | 2 109 966 A | 6/1983 | | G06F/3/00 |
| GB | 2 177 245 A | 1/1987 | | G09G/1/00 |
| GB | 2 248 370 A | 4/1992 | | H04L/12/46 |
| GB | 2 251 098 A | 6/1992 | | G06F/15/30 |
| GB | 2 258 749 A | 2/1993 | | G07F/7/08 |
| GB | 2 282 510 A | 4/1995 | | H04L/12/56 |
| WO | WO 91/07725 | 5/1991 | | G06F/15/24 |
| WO | WO91/17530 | 11/1991 | | G07G/1/100 |
| WO | WO 91/20046 | 12/1991 | | G06F/15/21 |
| WO | WO92/04679 | 3/1992 | | G06F/15/21 |
| WO | WO92/06438 | 4/1992 | | G06F/15/22 |
| WO | WO93/02422 | 2/1993 | | G06F/15/00 |
| WO | WO93/11494 | 6/1993 | | G06F/15/16 |
| WO | WO94/15428 | 7/1994 | | H04M/1/64 |
| WO | WO94/23383 | 10/1994 | | G06F/15/22 |
| WO | WO94/28497 | 12/1994 | | G06F/15/22 |
| WO | WO95/16971 | 6/1995 | | G06F/157/00 |
| WO | WO95/26535 | 10/1995 | | G06F/17/60 |
| WO | WO96/13013 | 5/1996 | | G06F/17/60 |
| WO | WO96/38799 | 12/1996 | | G06F/17/60 |
| WO | WO96/41286 | 12/1996 | | G06F/17/60 |
| WO | WO97/03423 | 1/1997 | | G07F/19/00 |
| WO | WO97/16897 | 5/1997 | | H04K/1/00 |
| WO | WO97/22191 | 7/1997 | | H04L/9/00 |
| WO | WO97/49053 | 12/1997 | | G07F/19/00 |
| WO | WO 99/16029 | * 4/1999 | | |

OTHER PUBLICATIONS

Buck, Peter S., "Electronic Commerce—Would, Could and Should You Use Current Internet Payment Mechanisms?", Internet Research, vol. 6, No. 2, pp. 5–18, 1996.*

Maciag, Gregory A., "E–Mail is the Glue That'll Hold Firms, People Together", National Underwriter (Property & Casualty/Risk & Benefits Management), vol. 99, No. 50, Dec. 11, 1995.*

Franklin, Curtis, "Keeping Secrets", VARbusiness, p. 144, May 1994.*

"Security, Payment, and Privacy for Network Commerce", B. Clifford Neuman, IEEE Journal On Selected Areas In Communications, vol. 13, No. 8, Oct. 1995.

*Catalog–Based Order Entry System*, S.N. Zilles, IBM Technical Disclosure, vol. 25, No. 11B, Apr. 1983, pp. 5892–5893.

"Privacy and Security Group Workshop on Network and Distributed System Security", Lawrence Livermore National Laboratory, Livermore, CA., Feb. 98—US Dept. of Commerce, National Technical Information Service.

"*General Electronic Payment System*", Jansson, L., $7^{th}$ Proceedings of the International Conference on Computer Communication, pp. 832–837 (1985).

"*Network Based Billing Server*", Mak, S., A Thesis Submitted to the Information Networking Institute, Carnegie Mellon Unitversity, pp. 1–55 (1991).

"*Kerberos Authentication and Authorization System*", Miller, S.P. et al., Project Athen Technical Plan, Massuchusetts Institute of Technology, pp. 1–21 (Oct. 27, 1988).

"Le Point Sur Le Telepaiement Par L'AFPAD", *France Telecom/La Lettre de Teletel*, No. 21, 1998, pp. 11–17(with English translation, entitled "A Summary of Electronic Payment by AFPAD", pp. 1–14).

M. Lapierre et al., "Videotex in France", *Commutation & Transmission*, No. 1, 1988, p. 47.

J.M. Bourdon et al., "The Bank Card Network in France", *Commutation & Transmission*, No. 4, 1988, p. 107.

J.A. Hart, "The Teletel/Minitel System in France", *Telematics and Informatics*, vol. 5, No. 1, 1988, pp. 21–28.

"New Telecommunications Services, Videotex Development Strategies", *Information computer Communications Policy*, 1988, Organisation for Economic Co–operation and Development (OECD), Paris, France.

A. Beutelspacher and T. Hueske, "Payment Applications with Multifunctional Smart Cards", *Proc. of the IFIP WG 11.6 Int'l. Conf. on Smart Card 2000: The Future of IC Cards*, Laxenburg, Austria, Oct. 1987, p. 95.

L. StrÅle, "Smart Cards and Information Security in Banking", *Proc. of the IFIP WG 11.6 Int'l. Conf. on Smart Card 2000: The Future of IC Cards*, Laxenburg, Austria, Oct. 1987, p. 103.

J.C. Pailles, "Public Key Devices: The ξCRSA", *Proc. of the IFIP WG 11.6 Int'l. Conf. on Smart Card 2000: The Future of IC Cards*, Laxenburg, Austria, Oct. 1987, p. 127.

F. Coutrot and J.P. Pommier, "Network Security Using Smart Card and LECAM", *Proc. of the IFIP WG 11.6 Int'l. Conf. on Smart Card 2000: The Future of IC Cards*, Laxenburg, Austria, Oct. 1987, p. 187.

\* cited by examiner

TRANSACTION PROCESS

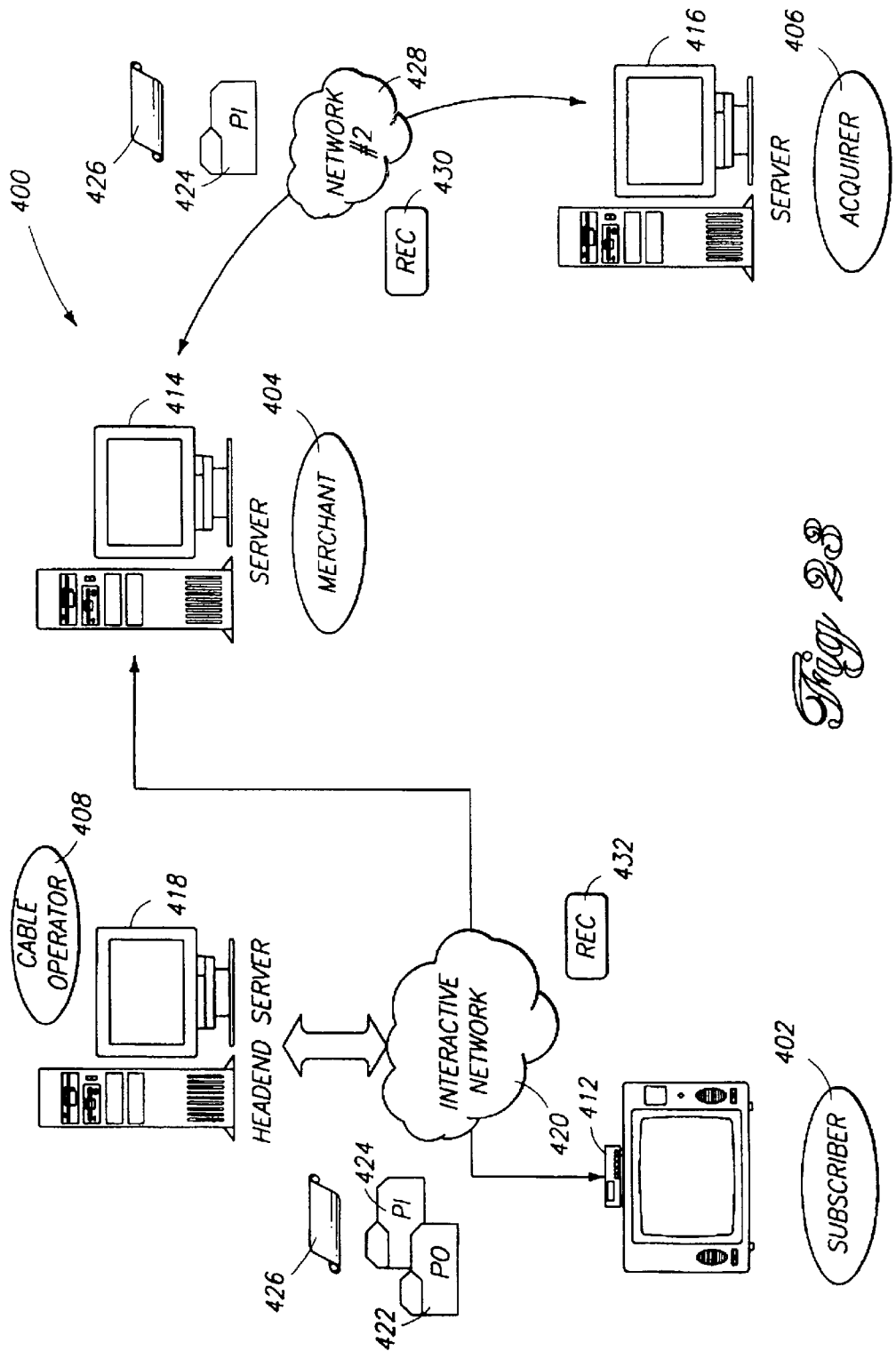

US 6,560,581 B1

SYSTEM AND METHOD FOR SECURE ELECTRONIC COMMERCE TRANSACTION

This is a continuation of Ser. No. 08/496,830, filed Jun. 29, 1995, now U.S. Pat. No. 5,790,677.

TECHNICAL FIELD

This invention relates to electronic commerce transactions. More particularly, this invention relates to systems and methods for secure electronic interchange of commerce documents and instruments by trading participants.

BACKGROUND OF THE INVENTION

Interchange of commerce documents and instruments between business trading partners takes place today both electronically and otherwise. Examples of common commerce documents include payment instruction receipts, purchase orders and receipts, and contracts. Examples of common commerce instruments are payment instructions (e.g., checks, credit cards) and currency. Techniques, practices, rules, and laws exist to engender confidence that transactions are executed according to conventional understanding of each trading partner. The commercial interchange has played a vital role in the growth of the world's commerce systems. Moreover, the commercial interchange has become increasingly important as transactions have evolved beyond the roots of face-to-face contact between trading partners to transactions between remotely located trading partners who never meet and may even reside in different countries.

As the pace, quantity, and breadth of commerce expands, there is a continuing need to expand the role of electronic processing in commercial interchange. Coincident with this expansion is the need to preserve the safeguards that have been historically developed to protect the interests of trading partners and minimize the risks to all participants. Authenticity, integrity, privacy, and security are among the principal requirements of an effective commerce system. The commercial participants must be authentic and the documents and instruments must have integrity. Additionally, the nature and terms of commerce transactions should be kept private and confidential among the participants. Moreover, there are circumstances where certain information (e.g., account numbers) may even be safeguarded within the set of participants.

Several problems arise when attempting to satisfy these requirements, particularly in an electronic setting. For instance, participants to a transaction might be impersonated, signatures on documents are subject to forgery, and the documents themselves are subject to undetectable alteration. Standardized rules and practices exist in the manual, non-electronic setting to minimize the risks of such problems. A notary signature is one such conventional practice. In the electronic arena, the risks have been traditionally mitigated by instituting proprietary commerce systems that are closed to the general public and by maintaining high security protocols on such proprietary systems. Hence, participants and documents are authenticated by definition, explicit signing is not required, and the integrity of the trading information and value are preserved within the confines of the closed processing system.

As personal computer (PC) technology continues to evolve, even greater electronic processing capabilities are being distributed into the hands of potential trading partners. Consumers, purchasing agents, merchants, suppliers, manufacturers, and financial institutions are but a few of the possible participants with easy access to significant electronic computing and communications tools and resources. PCs are natural tools to expand the quantity and breadth of commercial interchange. In order to reach the broadest possible audience of potential trading partners, however, an electronic PC-based commerce system must be designed without reliance on exclusive, closed, proprietary systems and networks.

SUMMARY OF THE INVENTION

This invention provides an electronic commerce system that facilitates commercial interchange of documents and instruments in a large, unrestricted audience of participants, while supporting the underlying principles of authenticity, integrity, privacy, and security. The electronic commerce system has a credential binding server at a trusted credential authority and multiple computing units at associated participants. The credential binding server and the multiple computing units are interconnected by a communication system, which is publicly available and can be already in existence. Example communication systems include an interactive television system, a credit card network, an ATM (Asynchronous Transfer Mode) switching network, a public network, a wide area network, a satellite network, and an RF network.

The participants initially register with the trusted credential authority for the right to participate in the electronic commerce system. Each computing unit generates and sends a registration packet over the communication system to the credential binding server. The packets are encrypted to promote security and privacy since the communication system is presumed to be inherently insecure and open to eavesdroppers. The packets also contain the digital signature of the participants to promote authenticity and integrity.

The credential binding server decrypts the packets, verifies their authenticity and integrity as originating from the participants, and produces a unique credential for each registering participant. The credential binding server digitally signs each credential on behalf of the trusted authority and sends the credentials to the appropriate participants. The participants are now equipped with credentials to participate in commercial activity over the electronic commerce system.

The transaction process takes place in an efficient manner between registered participants, and does not require any interaction with the trusted authority. An originating computing unit (e.g., a PC or set-top box at a purchaser's house) initiates a transaction by requesting and receiving the credentials of all intended recipient computing units (e.g., servers located at a merchant's facility and at a bank). The originating computing unit verifies the authenticity of the credentials by checking the digital signature of the trusted authority. If valid, the originating computing commences the commercial interchange.

The originating computer unit generates a set of one or more commerce documents that defines the transaction, and a set of one or more commerce instruments that defines the payment method for the transaction. The originating computer unit digitally signs the document(s) and instrument(s), and then encrypts them differently to insure that only the intended recipient for each can decrypt them. For instance, the originating computing unit might encrypt a commerce document using a symmetric encryption key, and then encrypt that key with a public key of the merchant that is intended to receive the document. In this way, only the intended recipient (i.e., the merchant) can decrypt the symmetric key by using its private key that matches the public encryption key. The intended recipient can then decrypt the document using the recovered symmetric key.

An instrument, on the other hand, is encrypted using another symmetric encryption key which is then encrypted using a public key of a second recipient (i.e., the bank) that is intended to receive the instrument. As a result, only the bank can open the encrypted instrument. It is further noted that in this example, the merchant cannot decrypt the instrument, nor can the bank decrypt the document, thereby ensuring privacy and security over the open communication system. The degree of security for the documents and instruments can be varied according to the strength of the chosen cryptographic keys.

The originating computer unit sends both the document(s) and instrument(s) to the first recipient participant (i.e., the merchant). The first recipient participant decrypts the symmetric key using its private key, and then decrypts the document using the decrypted symmetric key. The first recipient participant verifies the digital signature of the originating participant to assure itself that the document is legitimate and that it has not been altered since its generation by the originating computing unit. Unable to open the instrument, the first recipient participant passes the encrypted instrument onto a second recipient participant (i.e., the acquiring bank) for whom it was intended. The second recipient participant decrypts and verifies the instrument.

The second recipient participant returns a signed encrypted authorization receipt to the first recipient participant, for example, to guarantee payment for the ordered items. The first recipient participant then returns a signed encrypted purchase receipt to the originating participant to indicate that the purchase is approved and accepted.

The electronic commerce system according to this invention can be implemented with existing commercial systems. In one implementation, the commerce system is incorporated into a credit card system to facilitate purchase transactions between a consumer and a merchant, while complementing the existing credit card network that performs the payment card authorization and settlement process between the acquiring and issuing banks. In another implementation, the commerce system is incorporated into an interactive television system.

Each computing unit executes a commerce application to facilitate the document interchange. To perform the encryption, decryption, signing and verification functions, each computing unit in the electronic commerce system is loaded with a cryptography system which supports the commerce application. The cryptography system is software or combination software/hardware based system that operates on the computing units as a service layer to operating system commerce application. The cryptography system has a unique tri-layer architecture. It includes a cryptographic application program interface (CAPI) which provides functionality to the commerce application, one or more cryptographic service providers (CSP) which implement the functionality presented by the CAPI to the application, and one or more private application program interfaces (PAPI) which allow the CSPs to communicate directly with a user.

The CSPs perform the cryptography functions and manage the cryptographic keys. Preferably, the CSPs are implemented as dynamic linked libraries (DLLs) that are loaded on demand and authenticated by the CAPI, and then called to by the commerce application. To promote security, the commerce application does not ever gain direct access to the keys maintained in the CSPs, but is permitted to manipulate the keys only through the use of handles assigned by the CSPs to the keys. With this architecture, the DLLs can be modified or replaced without affecting the higher level commerce application.

The electronic commerce system satisfies the following design objectives:

1. Access to commercial interchange capabilities is ubiquitous. The electronic commerce system operates on existing public and private communication networks that vary widely in terms of architecture and implementation. The electronic commerce system is not implementation dependent and does not practice protocols that exclude use of certain networks.

2. Accommodates accepted principles of commerce. The electronic commerce system provides the standards of authenticity, integrity, and privacy. Additionally, it supports convenient, secure, and verifiable interchanges even though the communication systems are insecure and subject to attack by criminals attempting to steal or compromise commercially valuable information.

3. Complements existing electronic processing systems. The electronic commerce system interfaces with existing, entrenched commerce processing systems, such as the credit card network.

4. Adaptability to different commerce environments. The electronic commerce system can be implemented in vastly different commerce settings. Since the system is PC-based, and works over essentially any type of communication network, it can be easily adapted to different environments. Additionally, security levels and such can be prescribed according to the wishes of the commerce system owners by simply changing the CSP modules used to perform the cryptographic functions.

5. Conforms to acceptable regulatory and legal practices. By modifying the CSPs, the electronic commerce system can be flexibly adjusted to meet different regulations imposed by various governments. Regulated technologies, such as encryption and decryption, can be readily controlled within the system.

BRIEF DESCRIPTION OF THE DRAWINGS

FIG. 17 shows the credit card system is during the registration phase.

FIG. 23 is a schematic of the electronic commerce system embodied as an interactive entertainment system according to yet another aspect of this invention.

DETAILED DESCRIPTION OF THE PREFERRED EMBODIMENT

The following discussion assumes that the reader is familiar with cryptography. For a basic introduction of cryptography, the reader is directed to a text written by Bruce Schneier and entitled "Applied Cryptography: Protocols, Algorithms, and Source Code in C," published by John Wiley & Sons with copyright 1994, which is hereby incorporated by reference.

Electronic Commerce System

Figure 1:
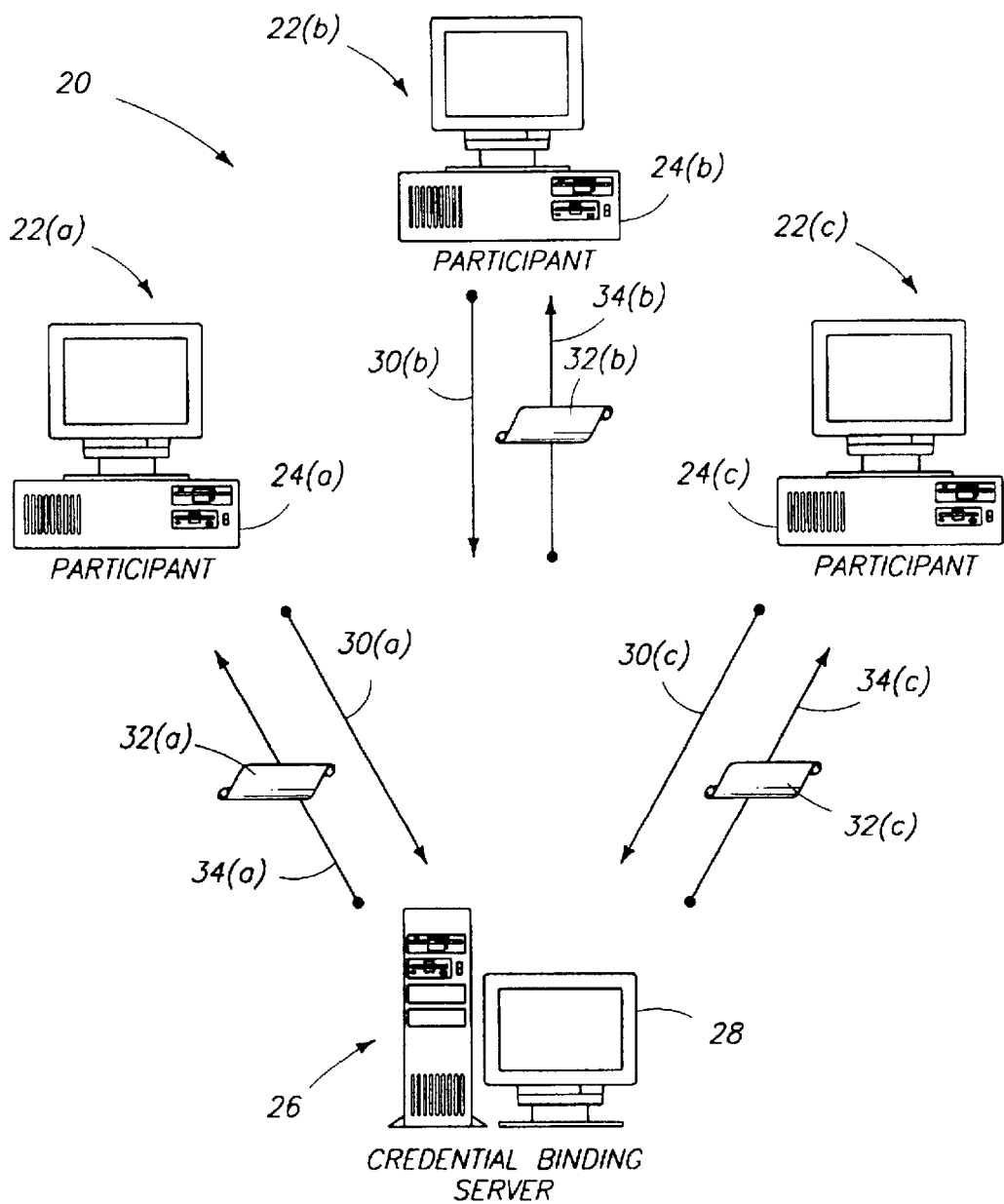
FIG. 1 is a schematic of an electronic commerce system during a registration process according to one aspect of this invention.
Figure 2:
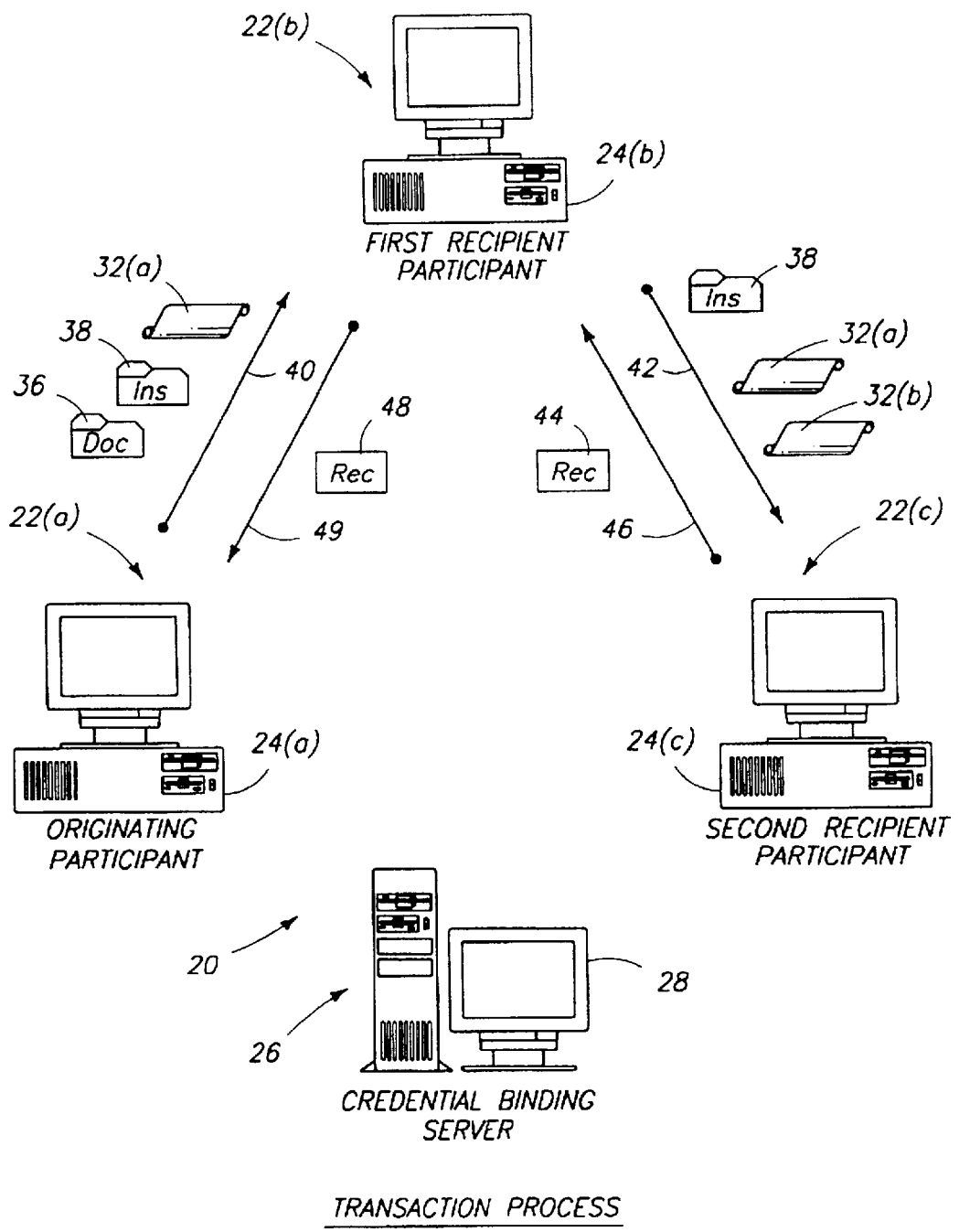
FIG. 2 is a schematic of the electronic commerce system during a transaction process according to another aspect of this invention.

FIGS. 1 and 2 show an electronic commerce system 20 for conducting secure electronic commerce transactions. The electronic commerce system 20 includes multiple trading partners or participants, which are represented by three participants 22(a), 22(b), and 22(c), and a certified trusted authority 26. Each individual electronic commerce transaction involves at least one commerce instrument and at least one commerce instrument. The commerce document defines the type of commerce transaction. Examples of commerce documents include purchase orders and receipts, contracts, and payment instruction receipts. The commerce instrument defines a mode of payment for the transaction. Examples of commerce instruments include payment instructions (e.g., checks and credit cards) and currency.

Computing units 24(a), 24(b), and 24(c) are provided at respective ones of the participants 22(a), 22(b), and 22(c). The computing units are depicted for illustration purposes as IBM(®-compatible personal computers, although other forms of computing units may be used. For instance, the computing units might be embodied as conventional computers (such as mainframe computers, servers, PCs, laptops, notebooks, etc.) or as other computational machines, such as banking ATMs (automated teller machines) and set-top boxes used in an interactive television system.

A computer server 28 is provided at the certified trusted authority 26. In the commercial context, the certified trusted authority is often referred to as a "credential binder," "binding authority," or simply "binder." The server 28 is thus referred to herein as the "credential binding server." The computer server is capable of receiving simultaneous requests from the multiple participants, as will be described in more detail below.

The computing units 24(a), 24(b), and 24(c) and computer server 28 are interconnected with each other via one or more communication systems. The communication systems can be embodied as a wire-based or wireless network. Examples of communications systems include an ATM (asynchronous transfer mode) switching network, a public network, a wide area network, an interactive television (ITV) network, a credit card network, a satellite network, and an RF network.

The electronic commerce system of this invention is extremely flexible and can be adapted to many different commerce transactions, as will become more evident from the continuing discussion. In the general model of the electronic commerce system 20 shown in FIGS. 1 and 2, a "participant" can be an individual person (such as a credit card holder, an ITV viewer, or a banking member at an automated teller machine), an entity or business (such as a merchant, cable operator, or service provider), or an institution (such as a bank). The certified trusted authority is a third party entity that every participant thoroughly trusts. This authority is established and recognized by all involved. Example certifying authorities in the financial environment include the federal reserve or a bank. The commerce environment in which the electronic commerce system is implemented defines the rules and information required to carry out the transactions, and additionally defines who or what entity is the certified trusted authority.

The electronic commerce system 20 can be implemented in different environments. As one example, the electronic commerce system can be implemented in an credit card network system. The electronic commerce system employs essentially the same existing banking and credit card commerce structure, while broadening access to that system to individual consumers. This example implementation is described below in more detail with reference to FIGS. 17 and 18. As another example, the electronic commerce system can be implemented in an interactive entertainment system which supports set-top boxes in each subscriber's home. This example implementation is described below in more detail with reference to FIG. 23.

The electronic commerce system 20 facilitates the secure exchange of commerce documents and commerce instruments over a communications system that is assumed to be insecure and open to eavesdroppers. Each computing unit is capable of encrypting or decrypting messages, digitally signing the messages, and verifying the authenticity of the messages from other participants. One preferred implementation of a cryptography system architecture is described below with reference to FIGS. 10 and 11.

General Operation

There are two distinct phases or processes that are performed by the electronic commerce system to provide the secure document interchange. The first phase, illustrated in FIG. 1, is an initial registration process in which each participant seeks approval of the certified trusted authority. The second phase, illustrated in FIG. 2, is a transaction process which involves the general document and instrument interchange among the various participants.

During the registration process (FIG. 1), the computing units 24(a)–24(c) at the participants 22(a)–22(c) are each programmed to generate and send a registration packet over the communication system (as represented by communication paths 30(a)–30(c)) to the credential binding server 28 at the trusted credential authority 26. The credential binding server 28 is programmed to produce unique credentials for each participant based upon their registration packets and to send the credentials 32(a)–32(c) back over the communication system (as represented by communication paths 34(a)–34(c)) to the multiple computing units 24(a)–24(c). These credentials are digitally signed by the trusted credential authority and will be used to identify and authenticate other participants during the commerce transaction. It is noted that the registration process requires interaction between each participant and the trusted credential authority.

After registration, the participants are ready to conduct their commercial activity. As shown in FIG. 2, the transaction process involves communication among the participants to the transaction without any interaction between the participants and the trusted credential authority. This is beneficial because it eliminates the need to check with a trusted credential authority during each commercial transaction and streamlines communication during the transaction.

Each commerce transaction has at least one originating participant and one or more recipient participants. A computing unit 24(a) at the originating participant 22(a) is programmed to request and receive the credentials of all intended recipient computing units 24(b) and 24(c). The originating computing unit also verifies the credentials by checking the digital signature of the trusted credential authority. The originating computing unit 24(a) then generates commerce document(s) 36 and commerce instrument(s) 38 that are appropriate for the type of commercial transaction. The document(s) and instrument(s) are both encrypted and sent together over a communication path 40 to the computing unit 24(b) at the first recipient participant 22(b). The document(s) and instrument(s) are encrypted using appropriately different keys so that only the participants to whom the document(s) or instrument(s) pertains can decrypt them.

The first recipient computing unit 24(b) is programmed to decrypt either the commerce document(s) 36 or the commerce instrument(s) 38 depending upon which one(s) is intended for and pertains to them. The first recipient computing unit 24(b) then passes the other(s) of the commerce document(s) 36 or the commerce instrument(s) 38 in encrypted form over a communication path 42 to a second computing unit 24(c) at the second recipient participant 22(c). The second recipient computing unit is programmed to decrypt the document(s) or instrument(s) intended for and pertaining to them.

As an example, the originating participant is a consumer, the first recipient participant is a merchant, and the second recipient participant is a financial institution, like a bank. The commerce document 36 is a purchase order from the consumer to buy goods or services from the merchant. The commerce instrument 38 is a payment instruction to the bank regarding how the consumer desires to pay for the goods or services. The merchant's computing unit 24(b) decrypts the commerce document 36 (i.e., a purchaser order) which pertains to the purchase of goods or services from the merchant. The bank's computing unit 24(c) decrypts the commerce instrument (i.e., the payment instructions) which pertains to payment for those goods or services. For added security, key components of the payment instruction (such as account number) may be encrypted within the public key envelope (i.e., next to the symmetric key used to encrypt the rest of the payment instruction).

Assuming the second recipient participant 22(c) can satisfy the commerce instrument, the computing unit 24(c) returns a signed authorization receipt 44 over communication path 46 to the first recipient participant 22(b) indicating that payment is guaranteed. The first recipient computing unit 24(b) then sends a signed purchase receipt 48 over communication path 49 to the originating computing unit 24(a) and compiles with the commerce document in delivering the ordered goods and services.

The electronic commerce system of this invention is advantageous because it optimizes efficiency in communication between the participants. During the transaction, the originating participant sends one package containing both the document and instrument to the same recipient. The document and instrument are encrypted differently so that only the intended recipient can open them. This aspect promotes security. The first recipient decrypts that portion pertaining to them, and forwards the rest on to the next recipient. Again, the first recipient only sends a package to one party. It is further noted that each participant can verify the contents using the digital signatures of the originating participant, and the digital signature of the trusted authority. In this manner, each participant can be assured that it is dealing with an authenticated party, without having to check with the trusted authority each time. Further, the first party can confirm that the goods/services can be sent/rendered before involving the bank.

The electronic commerce system and method for operating it will now be described in more detail with reference to FIGS. 1–8. The registration process is described with reference to FIG. 1 and the flow diagram of FIGS. 3–5, and the transaction process is described with reference to FIG. 2 and the flow diagram of FIGS. 6–8.

Registration Process

Each participant 22(a), 22(b), and 22(c) is required to register with the certified trusted authority 26 before being permitted to engage electronically in the commercial activity. The registration process involves communication over the communications system between each participant and the certified trusted authority as illustrated in FIG. 1. Each participant generates a registration packet containing general information about that participant (step 50 in FIG. 3). An application tailored to the particular commerce environment can be distributed to the participants to assist them in gathering and submitting the information required by the certified trusted authority. For example, the registration packet includes identification information (name, location, etc.), public cryptography keys unique to the participant, and a digital signature of the participant.

Figure 4:
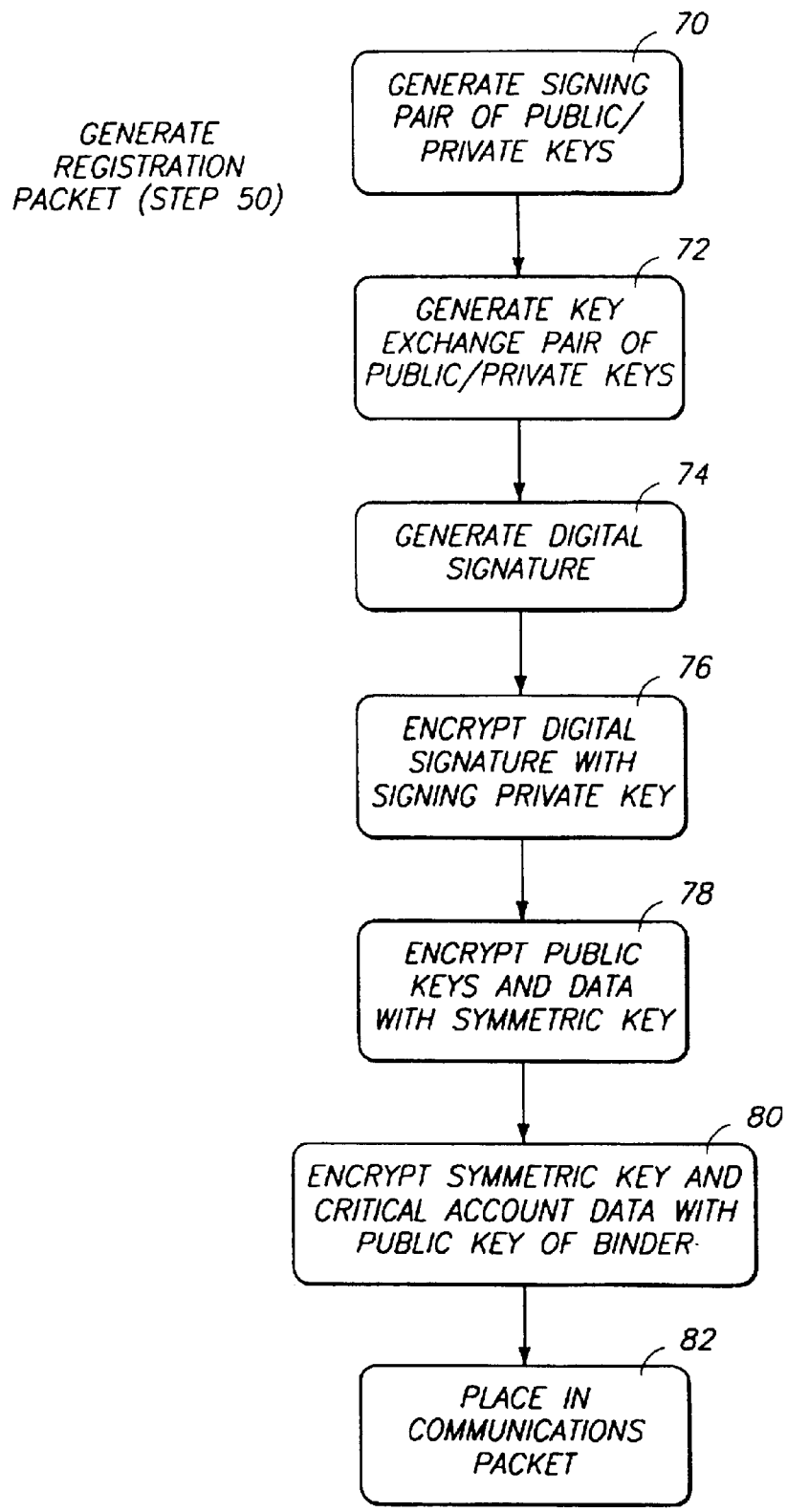
FIG. 4 is a flow diagram of a process for generating a registration packet that is performed during the registration process.

FIG. 4 shows the method for generating the registration packet according to a preferred implementation. At steps 70 and 72, the computing unit generates two asymmetric pairs of public and private cryptography keys. An "asymmetric" key algorithm involves two separate keys, for example, one key to encrypt and one key to decrypt. The keys are based upon a mathematical relationship in which one key cannot be calculated (at least in any reasonable amount of time) from the other key. Encryption and decryption using an asymmetric key pair can be represented as follows:

$$E_{Kpri}(M)=M'$$

$$D_{Kpub}(M')=M$$

where "$E_{Kpri}$" is an encryption function using a private key "Kpri," "M" is a plaintext message, "M'" is an encrypted version of the plaintext message, and "$D_{Kpub}$" is a decryption function using the public key "Kpub". The inverse is also true in that a plaintext message can be encrypted using the public key and then decrypted using the private key.

In a public key system, the public key is distributed to other parties and the private key is maintained in confidence. The asymmetric public and private keys ensure two results. First, only the holder of the private key can decrypt a message that is encrypted with the corresponding public key. Second, if another party decrypts a message using the public key, that party can be assured that the message was encrypted by the private key and thus originated with someone (and presumably the holder) of the private key. An example asymmetric cipher is the well-known RSA cryptographic algorithm named for the creators Rivest, Shamir, and Adleman.

At step 70 of FIG. 4, the computing unit generates a signing pair of public and private cryptography keys which are used during commerce transactions to generate the participant's digital signature by encrypting the output of a hash function. At step 72, the computing unit generates an asymmetric key exchange pair of public and private cryptography keys. The key exchange pair is used during the commerce transaction to encrypt keys that in turn are used to encrypt data contained in the messages.

At step 74, the participant generates a digital signature that is unique to the participant and to the message. The digital signature is computed by hashing the data contained in the registration packet. A hash function is a mathematical function that converts an input data stream into a fixed-size, often smaller, output data stream that is representative of the input data stream. Once the hash is computed, it is encrypted by the computing unit with the private encryption key of the signing pair (step 76 of FIG. 4). This is represented as follows:

$$E_{Ksign\_pri\_part}(dS_{part})=dS'_{part},$$

where the "E" denotes an encryption function on the hash of the message "$dS_{part}$" and the subscript "Ksign_pri_part" means the participant's private key of the signing pair was employed to perform the encryption. By encrypting the participant's signature with its own private signing key, the eventual recipient will be able to verify the participant's digital signature by decrypting the hash using the participant's public signing key, independently computing the hash of the original message, and comparing the locally computed hash with the decrypted hash. The comparison will succeed only if the participant's private signing key was used to encrypt the hash. Since only the originating participant knows the private signing key, the recipient knows that the originating participant actually created the encrypted hash, essentially "signing" the document.

At step 78, both public keys of the signing pair and the key exchange pair are encrypted with a symmetric cipher using a randomly selected bulk data symmetric encryption key. In a "symmetric" cipher, the encryption key can be calculated from the decryption key, and vice versa. In many cases, the encryption key and the decryption key are the same. Encryption and decryption using a symmetric key can be represented as follows:

$$E_K(M)=M'$$

$$D_K(M')=M$$

where "$E_K$" is an encryption function using the symmetric key "K" and "$D_K$" is the decryption function using the same encryption key "K". The symmetric key must be known to both the sender and receiver, but otherwise kept secret. Once the symmetric key is divulged, any party can encrypt or decrypt messages. Example symmetric ciphers are a DES (Data Encryption Standard) encryption algorithm or an RC4 algorithm.

The data to be included in the registration packet is also encrypted with the same, or additional symmetric encryption keys. Step 78 is represented as follows:

$$E_{Ksym}(data, K_{sign\_pub\_part}, K_{exc\_pub\_part})=\text{Data'}\& K'$$

where "$E_{Ksym}$" is the encryption function using the symmetric key, "$K_{sign\_pub\_part}$" is the participant's public key of the signing pair, and "$K_{exc\_pub\_part}$" is the participant's public key of the key exchange pair.

To prevent divulgation of the symmetric key (or keys), the computing unit at the registering participant encrypts the symmetric key using an asymmetric cipher which employs a public encryption key unique to the certified trusted authority or binder (step 80). By using the binder's public key, the participant is assured that only the binding authority will be able to decrypt the symmetric key, and hence the rest of the registration packet. The encryption of the symmetric key is represented as follows:

$$E_{Kpub\_binder}(K_{sym}=K'_{sym},$$

Notice that the data encryption process involves a dual encryption technique: a first encryption of data using the symmetric key, and then a second encryption of the symmetric key using an asymmetric key pair. This dual encryption affords the desired security through the use of a strong asymmetric key pair, while facilitating encryption of bulk data using the more efficient symmetric key.

At step 82 in FIG. 4, the computing unit places the encrypted data, digital signature, and public keys in a communications packet. The communications packet is suitable for the appropriate communications system supporting the electronic commerce system 20. Preferably, the communications packet is in the form of individual digital data structures that contain the appropriate routing information to efficiently locate the intended recipient.

With reference again to FIG. 3, the next step 52 in the registration process is for each participant computing unit 24(*a*), 24(*b*), and 24(*c*) to send its completed registration packet to the credential binding server 28 over the communications system. This step is represented graphically in FIG. 1 by communication paths 30(*a*)–30(*c*) from the participants 22(*a*)–22(*c*) to the certified trusted authority 26.

Figure 3:
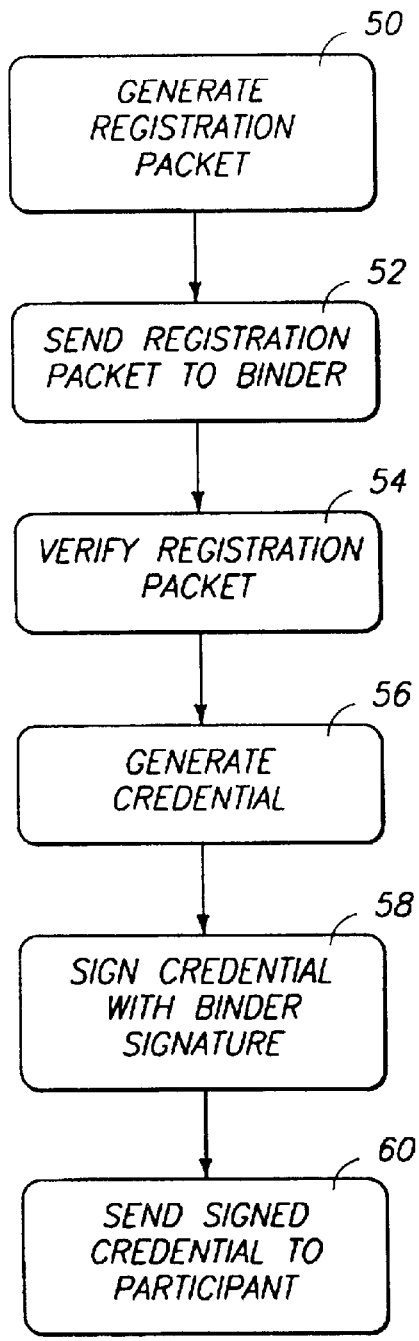
FIG. 3 is a flow diagram of the registration process in a method for conducting an electronic commerce transaction according to yet another aspect of this invention.

At step 54 in FIG. 3, the credential binding server 28 verifies the authenticity of the registration packets as being sent by the participants. The verification process itself is described in more detail with reference to FIG. 5. At step 90, the credential binding server 28 decrypts the symmetric bulk data encryption key $K_{sym}$, using its own private key as follows:

$$D_{Kpri\_binder}(K'_{sym})=K_{sym}.$$

Figure 5:
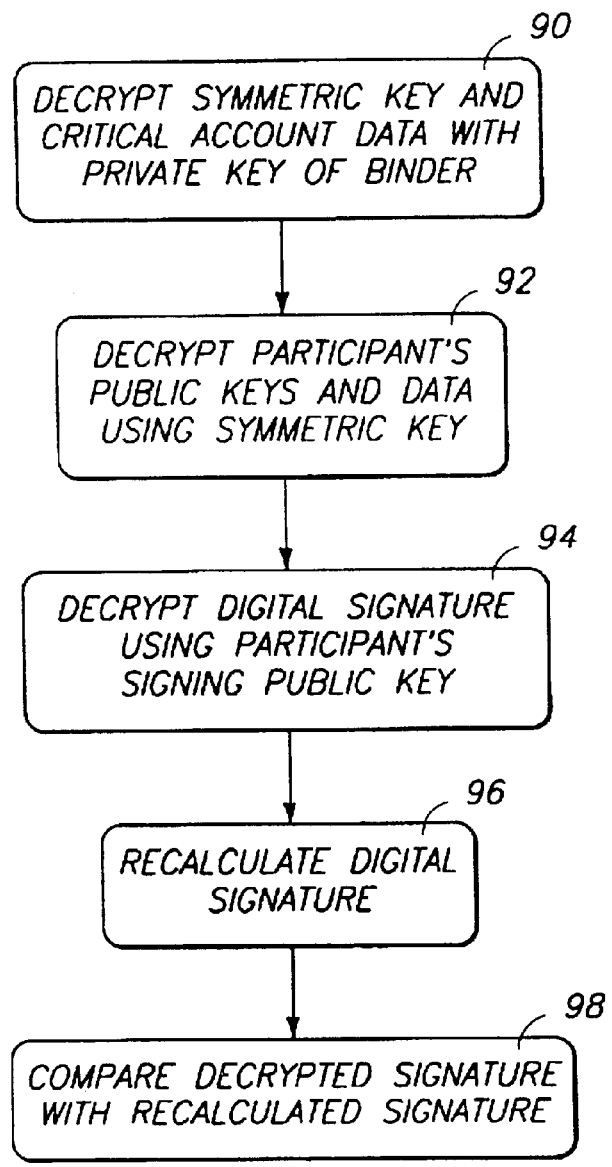
FIG. 5 is a flow diagram of a process for verifying a registration packet that is performed during the registration process.

Once the symmetric key is recovered, the credential binding server 28 uses it to decrypt the participant's public keys and other data contained in the registration packet (step 92 in FIG. 5). This can be shown as:

$$D_{Ksym}(\text{Data'}\& K')=\text{data}, K_{sign\_pub\_part}, K_{exc\_pub\_part}.$$

Next, at step 94, the credential binding server 28 decrypts the hash of the participant using the recovered participant's public signing key, $K_{sign\_pub\_part}$. This yields the hash, dS, as computed and concealed (encrypted) by the originating participant:

$$D_{Ksign\_pub\_part}(dS'_{part})=dS_{part}.$$

The credential binding server 28 then performs a two-step verification technique to verify that the packet actually originated from the participant, and not an impostor. At step 96, the credential binding server 28 recalculates the participant's digital signature by hashing the data contained in the decrypted registration packet using the same hashing function employed by the participant. The recalculated hash is then compared with the decrypted hash received as a digital signature, i.e., privately encrypted hash, in the registration packet (step 98 in FIG. 5). If the two hashes match, the credential binding server is assured both that the registration packet was indeed signed by the participant and that the contents have not been subsequently altered.

Returning once again to FIG. 3, after the credential binding server 28 verifies the registration packet as belonging to the participant, the next step 56 in the registration process is to generate a credential for the participant. The credential binding server 28 generates the credential. Each credential is unique to a particular participant, and will be used in future transactions as a means for identifying the participants and for authenticating the participants to each other. The credential contains the participant's public signing key, public key exchange key, unique identifiers, validity dates, owner information, issuer information, and information about the participant determined in advance by owners and controllers of the particular commerce environment.

At step 58, the credential binding server 28 attaches a digital signature of the trusted credential authority 26 to the credential. The digital signature is generated by encrypting a hash of the credential using the private key of the trusted credential authority 26. The binder's digital signature will be used by the participants during transactions to verify that communications are between authorized participants who have properly registered with the trusted credential authority. At step 60, the signed credential is transferred from the credential binding server 28 back over the communications system to the individual computing units 24(a), 24(b), and 24(c) at respective participants 22(a), 22(b), and 22(c). The is illustrated in FIG. 1 by the signed credentials 32(a)–32(c) being returned to the computing units along communication paths 34(a)–34(c).

Transaction Process

Following the registration process, the participants are ready to conduct their commercial activity. Unlike the registration process, however, the transaction process involves communication only among the participants to the transaction. There is no interaction between any of the participants and the trusted credential authority.

As shown in FIG. 2, the commerce transaction process concerns the interchange of documents and instruments by participants, such as the representative three participants 22(a)–22(c). The number of participants involved in a commerce transaction, the nature and content of the documents and instruments, and the exchange protocol are all defined in advance according to the particular commerce environment. Here, the participants 22(a)–22(c) interchange information over the one or more communication systems between them, as illustrated by the pairs of arrows, without involving the credential authority 26.

All commerce transactions have an originating participant, which is represented by participant 22(a), and one or more recipient participants, which are represented by participants 22(b) and 22(c). The originating participant 22(a) is the one who initiates a commerce transaction. The computing unit 24(a) at the originating participant 22(a) starts the commerce transaction by transmitting a request for the credentials of the intended recipient participants 22(b) and 22(c) who will be involved in the transaction (step 100 in FIG. 6). The computing units 24(b) and 24(c) at respective recipient participants 22(b) and 22(c) return their unique credentials to the originating computing unit 24(a) (step 102 in FIG. 6).

Figure 6:
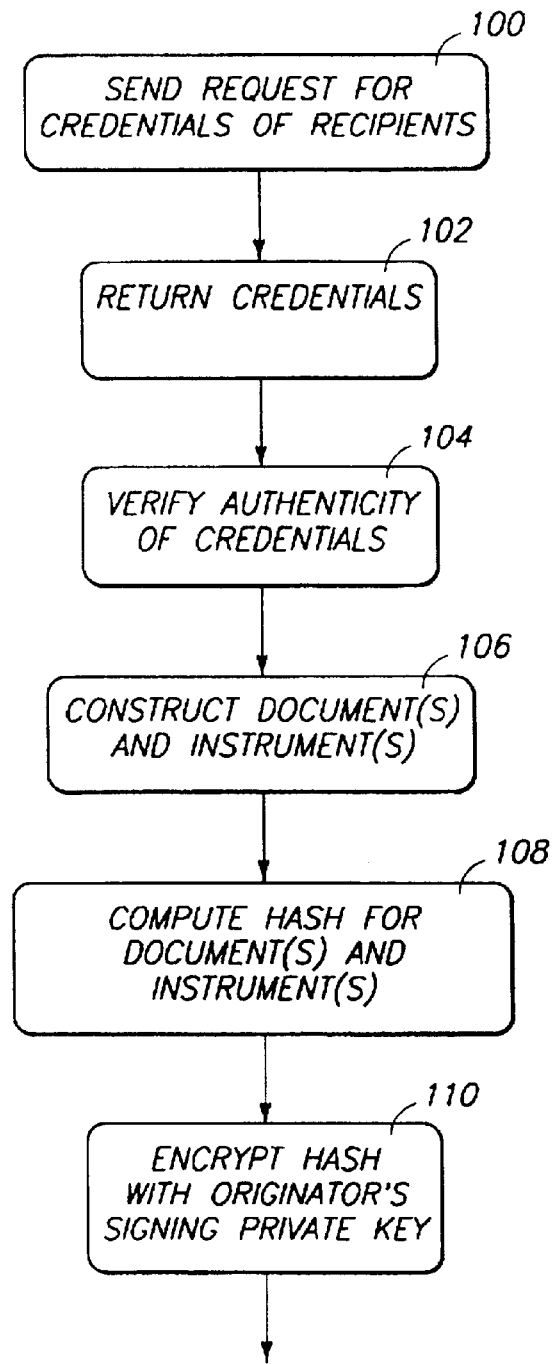
FIGS. 6–8 present a flow diagram of the transaction process in the method for conducting an electronic commerce transaction.

At step 104 in FIG. 6, the originating computing unit 24(a) verifies the authenticity of the intended recipient participants. This verification is achieved by validating the digital signature of the trusted credential authority that is attached to the credential. Recall from the registration process described above that the credential binding server digitally signed each credential by encrypting the hash of the credential with the secret private signing key of the trusted credential authority. The originating computing unit 24(a) decrypts the hash by decrypting the encrypted hash using the binder's public key. If the decrypted hash matches, bit-for-bit, an independently and locally (trusted) hash of the credential, then the originating computing unit is assured both that the credential was created and signed by the trusted credential authority and has not been subsequently modified, and that the recipient participant is thereby authenticated.

At step 106, the originating participant 22(a) constructs the appropriate commerce document and commerce instrument for the commercial transaction. A commercial transaction might involve more than one document or instrument, but for simplicity of discussion, our example transaction involves one document and one instrument. At step 108 in FIG. 6, the originating computing unit 24(a) computes the hash of the document and instrument through use of a hashing algorithm. At step 110, the originating computing unit 24(a) encrypts the hash using the private signing key of the originator's signing pair of asymmetric keys, as follows:

$$E_{Ksign\_pri\_part}(dS_{org\_part})=dS'_{org\_part}$$

Figure 7:
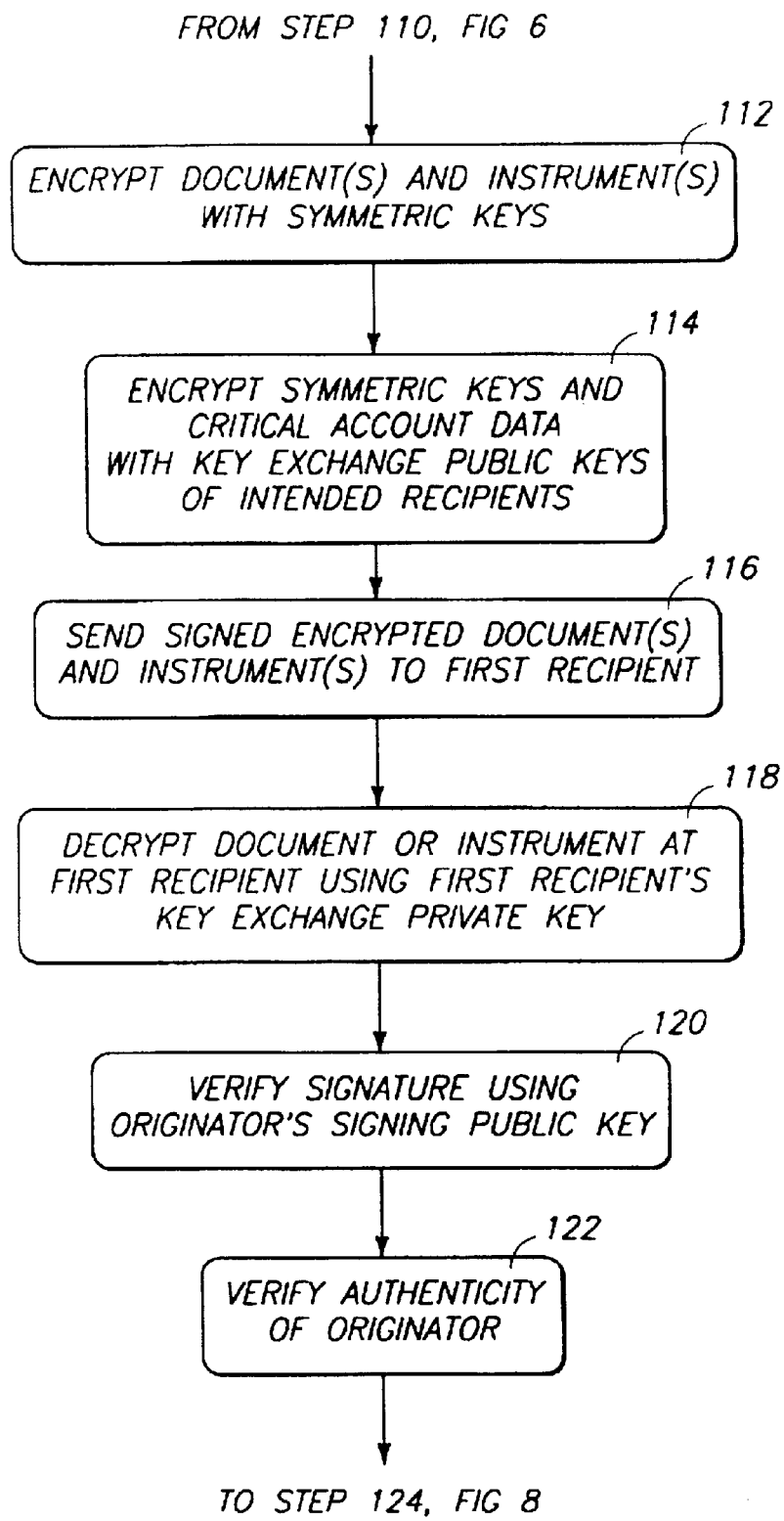

Next, at step 112 in FIG. 7, the originating computing unit 24(a) generates symmetric bulk data encryption keys and encrypts the document and instrument using the symmetric keys. Preferably, the document is encrypted with one symmetric encryption key and the instrument is encrypted with a different symmetric encryption key. The encrypted hash, $dS'_{org\_part}$ attached to the document and instrument as a digital signature is also encrypted using the symmetric encryption keys. The bulk encryption step is represented as follows:

$$E_{K1sym}(document+dS'_{org\_part})=document'$$

$$E_{K2sym}(instrument+dS'_{org\_part})=instrument'.$$

At step 114 in FIG. 7, the originating computing unit 24(a) encrypts the symmetric keys with the public key exchange keys of the recipient participants that are intended to receive the document and instrument. For example, suppose the commerce document is a purchase order that is intended for the first recipient participant 22(b), who is a merchant. Further, suppose the commerce instrument is a payment instruction that is intended for the second recipient participant 22(c), which is a bank. The originating computing unit 24(a) encrypts the first symmetric key used to encrypt the document (i.e., purchase order) and originator's digital signature with the first recipient's (i.e., merchant's) public key from its key exchange pair of asymmetric keys. This public key exchange key was obtained from the first recipient's credential. Similarly, the originating computing unit 24(a) encrypts the second symmetric key used to encrypt the instrument (i.e., payment instruction) and originator's digital signature with the second recipient's (i.e., bank's) public key exchange key that was obtained from the first recipient's credential. Furthermore, sensitive or otherwise critical account information (such as a credit card account number) may be concatenated with the symmetric key, such that the account information also is encrypted with the recipient's (i.e., bank) public key exchange key. This affords some longer term protection for the account information, should the symmetric key or algorithm ever become compromised. This step is represented as follows:

$$E_{Kkeyexch\_pub\_1st\_recip}(K_{1sym})=K'_{1sym}$$

$$E_{Kkeyexch\_pub\_2nd\_recip}(K_{2sym})=K'_{2sym}$$

At step 116, the originating computing unit 24(a) transmits the signed encrypted document and instrument over the communication system to the computing unit 24(b) at the first recipient participant 22(b). This is illustrated diagrammatically in FIG. 2 by the document folder 36 and the instrument folder 38 being forwarded along communication path 40. The originating computing unit 24(a) also forwards the credential 32(a) of the originating participant 22(a) so that the recipients will have the necessary information to return communication.

At step 118, the computing unit 24(b) at the first recipient participant 24(b) decrypts the portion of the package that pertains to them. To continue our above example, the first recipient participant 24(b) is a merchant and the commerce document is a purchase order that is intended for the merchant. Accordingly, the merchant computing unit 24(b) decrypts the document portion. The computing unit 24(b) initially decrypts the first symmetric bulk data encryption key using its own private key of the key exchange pair of asymmetric keys, as follows:

$$D_{Kkeyexch\_pri\_1st\_recip}(K'_{1sym})=K_{1sym}$$

The merchant computing unit 24(b) then decrypts the document, or purchase order, using the decrypted symmetric bulk data encryption key, as follows:

$$D_{K1sym}(document')=document+dS'_{org\_part}$$

This decryption also yields the originator's signature which itself is the hash of "document" encrypted with the signing private key of the originating participant. At step 120, the first recipient computing unit 24(b) verifies the originator's signature using the originator's signing public key which was provided in the originator's credentials that was forwarded with the document and instrument. If the decryption yields a hash that compares, bit-for-bit, with an independently, locally computed hash of "document", the first recipient participant 22(b) can be assured that the originating participant 22(a) sent the document, signed the document, and that the document was intended for the first recipient participant. The first recipient participant can authenticate the originating participant by verifying the digital signature of the credential binding authority on the signature credential of the first recipient in the manner described above (step 122 in FIG. 7).

Notice that the method of this invention calls for the originating participant to forward both the document and instrument to the first recipient participant. In this manner, the commerce transaction is greatly simplified in that the originating recipient only forwards the items to one place. However, the first recipient participant can only decipher and read that portion of the package that is destined or intended for it. By encrypting those portions (in this case, the document) with the first recipient's public key exchange key, the originating participant is assured that only the first recipient can decrypt the document using its key exchange private key. Furthermore, by encrypting the other portions (in this case, the instrument) with the public key of the second recipient participant, the originating participant is assured that the first recipient participant cannot decrypt the instrument.

Figure 8:
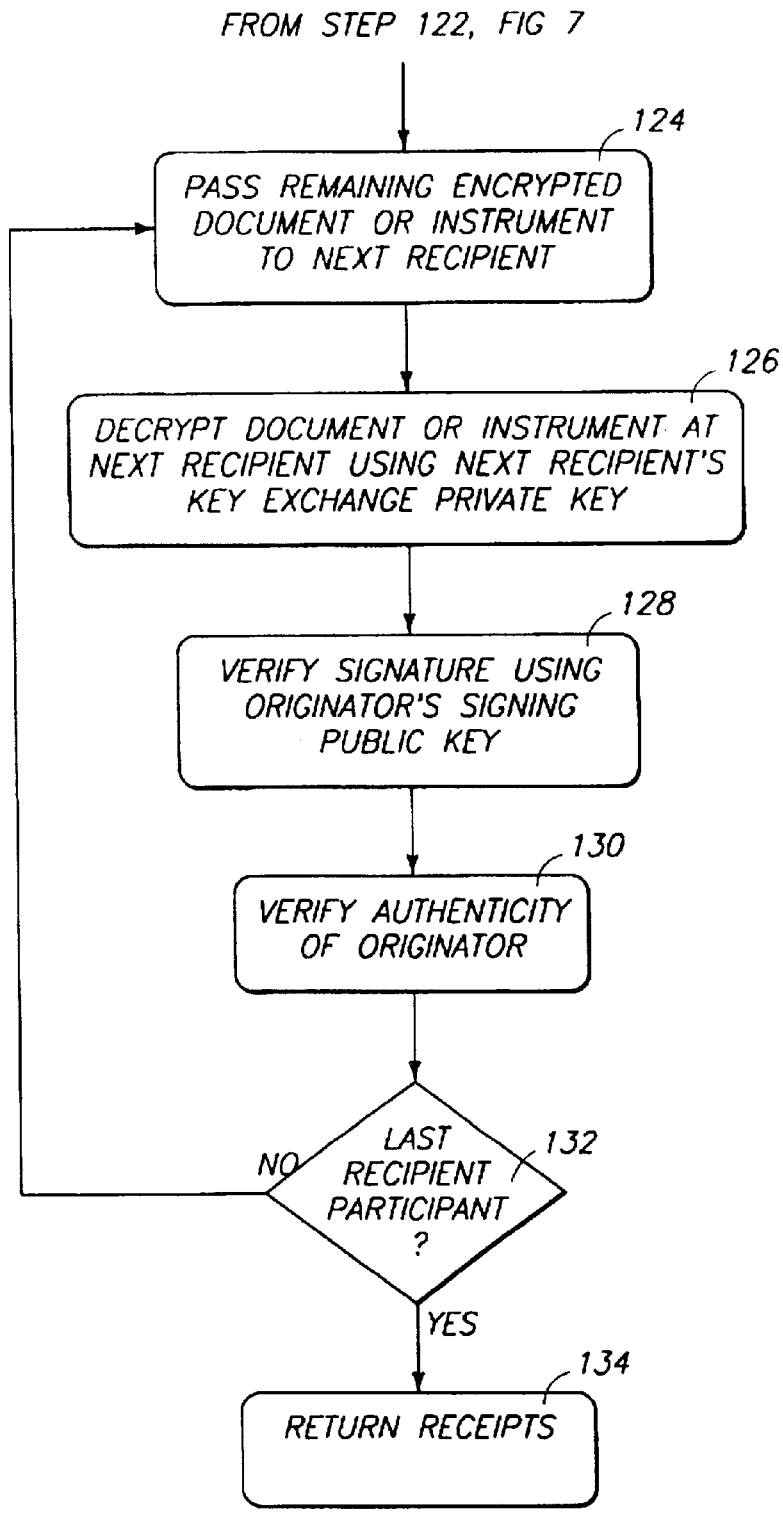

At step 124 in FIG. 8, the computing unit 24(b) at the first recipient participant 22(b) repackages the encrypted instrument in another communications package and passes the package onto the computing unit 24(c) at the second recipient participant 22(c) over the same or a different communication system. This is illustrated diagrammatically in FIG. 2 by the instrument folder 38 being forwarded from the first recipient computing unit 24(b) along communication path 42, to the second recipient computing unit 24(c). The first recipient computing unit 24(a) also sends along its credential 32(b), and the originating participant's credential 32(a), so that the second recipient participant will have the necessary information to return communication.

Steps 126, 128, and 130 are similar to steps 118, 120, and 122 that were described above. Briefly, the computing unit 24(c) at the second recipient participant 24(c) decrypts the commerce instrument (step 126). In our example, the second recipient participant is a bank which decrypts the payment instructions concerning how the purchaser (i.e., the originating participant) intends to pay for the items ordered from the merchant (i.e., the first recipient participant). The instrument decryption involves a two-step process of (1) decrypting the second symmetric bulk data encryption key using its own private key exchange key, and subsequently (2) decrypting the instrument (e.g., payment instructions) using the recovered second symmetric key. This two-step procedure is represented as follows:

$$D_{Kkeyexch\_pri\_2nd\_recip}(K'_{2sym})=K_{2sym}$$

$$D_{K2sym}(instrument')=instrument+dS'_{org\_part}$$

Notice that this decryption also yields the originator's signature, which itself is a hash of "instrument", encrypted with the private signing key of the originating participant. At steps 128 and 130, the second recipient computing unit 24(c) decrypts the originator's signature using the originator's public signing key that was provided in the originator's credentials and verifies the digital signature (by, independently computing the hash of "instrument") and authenticity of the originating participant (by verifying the digital signature of the credential binding authority on the signature credential of the originating participant).

At step 132, it is determined whether there are any more participants involved in the transaction. If there were more recipient participants (i.e., the "no" branch from step 132), the second recipient would simply pass the remaining portions of the package, which would still be encrypted, onto the next participant (step 124). The process of steps 126–130 would then be repeated. In our example, however, there are only two recipient participants: merchant and bank. Since there are no more participants (i.e., the "yes" branch from step 132), the participants can return the appropriate receipts at step 134.

If the transaction is approved by the second recipient, meaning that the bank determines that it can fulfill the originator's commerce instrument, the computing unit 24(c) at the second recipient participant (i.e., the bank) returns a signed authorization receipt to the first recipient participant (i.e., the merchant) that payment is guaranteed. This is shown in FIG. 2 by the return receipt 44 being transmitted over communication path 46. Once the first recipient computing unit 24(b) receives the receipt, it will send a signed purchase receipt for the purchase to the originating computing unit 24(a) and fill the purchase order. This is shown in FIG. 2 by the return receipt 48 being transmitted from the first recipient computing unit 24(b) over communication path 49 to the originating computing unit 24(a).

Alternate Cryptography Approaches

Although the preceding section provides a description of the process using public key cryptography, those skilled in the art can see that other cryptographic approaches exist.

In one embodiment, the symmetric keys used for the documents or instruments may be pre-established amongst the participants. This will reduce the overall canonical data size as well as eliminate several public key decryption operations, thereby enhancing performance. In such an embodiment, the keys may be exchanged or established through a variety of means.

In another embodiment, authentication of the participants, as well as the exchange of symmetric keys may be accomplished through a trusted third party. For example, the Kerberos system is one such architecture which facilitates this embodiment.

In yet another embodiment, the digital signature technique used may be based on a technology other than public key. For example, the El Gamal digital signature technique, based on symmetric key cryptography, may be used.

In yet another embodiment, the hash values from each of the document(s) and commerce instrument(s) might be concatenated and then encrypted using the originator's private signature key. This has the advantage of computing only one public key encryption for multiple documents.

Negotiated Off-line Encryption Architecture

In a number of countries, encryption is subject to stringent regulation. Limitations may be applied to the algorithms as well as the key sizes used. In order to enable and ensure compliance with applicable regulations, it may be necessary for the communicating participants to negotiate or otherwise pre-establish the applicable parameters. In transaction commerce electronically, the participants may not necessarily be in direct communication (e.g., they may be communicating via Electronic Mail).

In such a situation, it is necessary for the parties to have a trusted way of mutually agreeing on the appropriate encryption algorithms and key sizes. Given that the parties have already established a mutually trusted party (the certifying authority/binder), it follows that the binder can be trusted to provide an indicator for each participant on what that participant's limitations are. An index which indicates the strongest algorithm and key size is placed on each participant's credential.

When an originating participant encrypts a document or instrument for a specific recipient, that originating participant takes his or her encryption index, along with the encryption index of the intended recipient, and uses the two values to look up the appropriate algorithm in a pre-established table. This table typically is established by the certifying authority for the version of the commerce protocol being used.

The table typically contains the least common denominator of encryption allowed between the two participants. This is particularly useful in international commerce, where the regulations for one participant may differ from that of another. It is assumed (and the responsibility of the credential authority) that the algorithm/key size at the intersection in the table is one which is compliant with both countries involved in the transaction.

Table 1 illustrates an example preestablished table used in a negotiation process between a first participant with one possible encryption index and a second participant with another possible encryption index. In this example, the encryption indices range from a value "0" which represents the inability to encrypt items to a value "2" which represents the ability to use rather secure encryption techniques.

TABLE 1

|   | 0 | 1 | 2 |
|---|---|---|---|
| 0 | No Order Encryption | No Order Encryption | No Order Encryption |
| 1 | No Order Encryption | 40 Bit RC4 | 32 Bit RC4 |
| 2 | No Order Encryption | 32 Bit RC4 | 64 Bit RC4 |

Communication Data Structure

Figure 9:
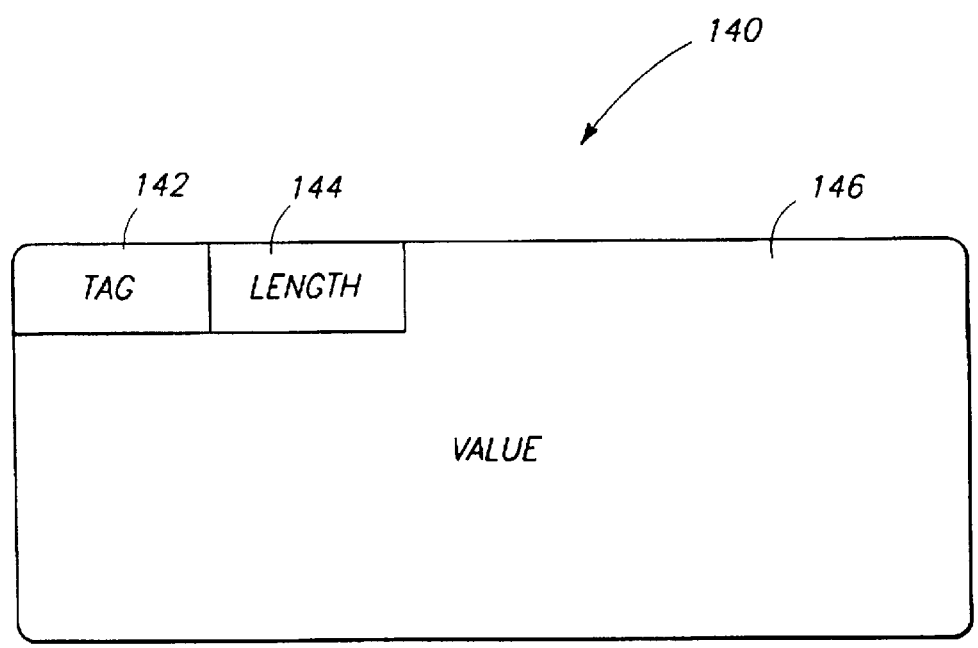
FIG. 9 is a data structure used in the interchange of data between participants in the electronic commerce system.

FIG. 9 shows a data structure 140 used to carry each package that is exchanged between the participants, or between the participant and the credential trusted authority. It is used to encapsulate the messages and the message components. The data structure is a "tag-length-value" structure that provides a convenient way to handle fields as self-defined entities. This affords the flexibility of adapting to the message content being sent.

The tag-length-value (TLV) data structure 140 consists of three parts: an identifier field 142 (which is also known as the "tag"), a length field 144, and a value field 146. The identifier field or tag 142 is a fixed-size field (e.g., 32-bit) that defines or identifies the commerce data contained in the package. Only those tags defined for the particular commerce environment may be used. The length field 144 is a variable-sized field which contains a length of the commerce data contained in the package. The length field is preferably an exact byte count of the data contained in the value field 146. For string fields that are NULL-terminated, the count includes the NULL character. The value field 146 is a variable-sized field which contains the actual commerce data defined by the tag.

There are many benefits resulting from this TLV data structure 140. First, the data structure allows data elements to be self-describing, which affords tremendous flexibility. Second, it renders the data elements conducive to C++ programming protocols. Another benefit is that the TLV data structure facilitates future protocol extensibility. Still another reason is that the data structure enables backward compatibility. Further, the data structure permits customization of the contents of messages to fit the particular commerce environment without impacting the basic architecture, technology and implementation of the electronic commerce system itself.

Cryptography System Architecture

Each computing unit 24(a)–24(c), as well as the credential server 28, is equipped to perform cryptographic functions including encryption, decryption, digital signing, and verification. The computing units are programmed to execute a commerce application that facilitates the computerized, electronic commerce system. To sustain the security and authentication functions of the electronic commerce system, the commerce application must be able to provide encryption, decryption, and digital signing. Accordingly, each computing unit is implemented with a cryptography system that supports the commerce application with respect to these functions.

Figure 10:
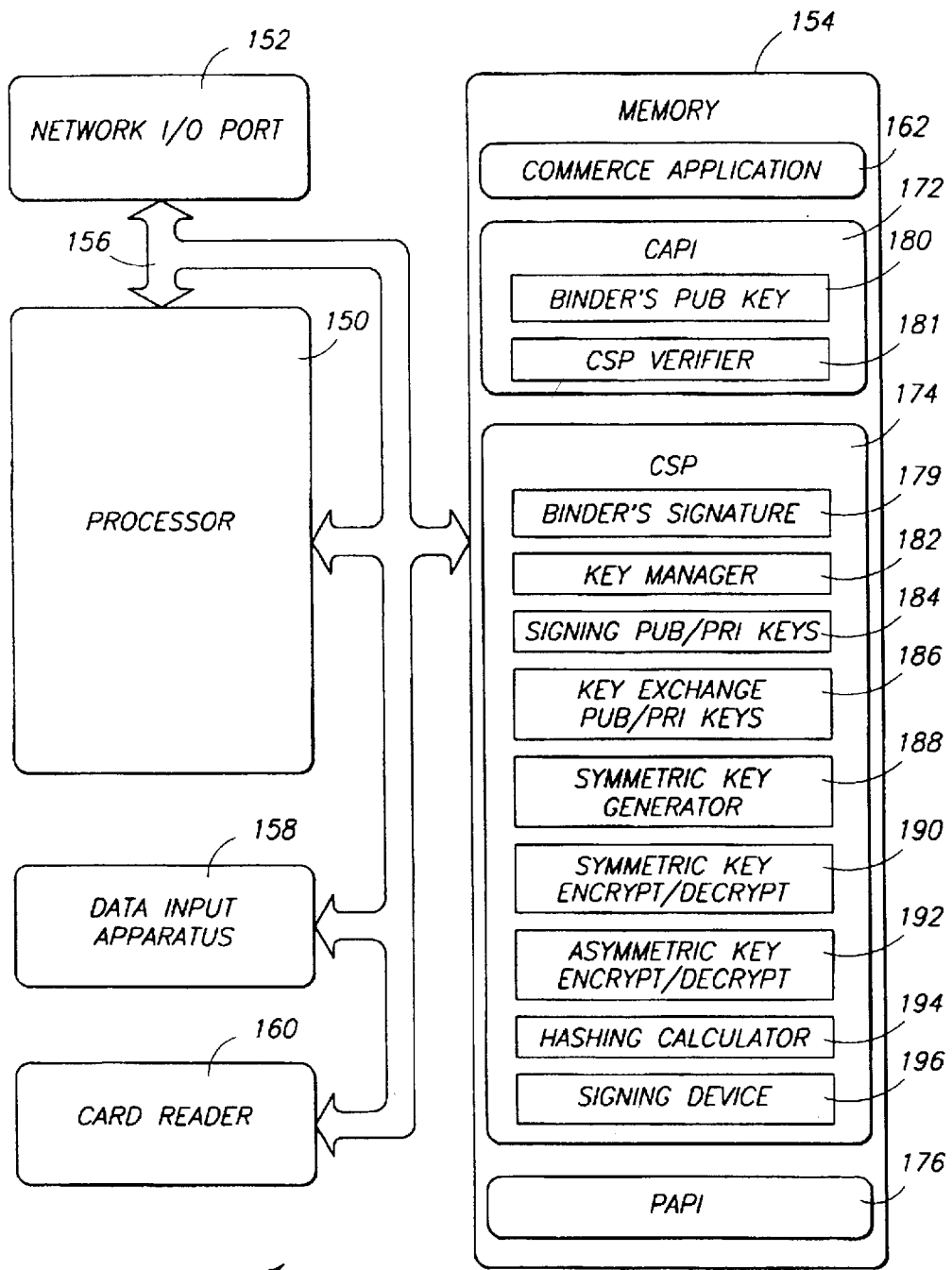
FIG. 10 is a block diagram of a computing unit provided at each participant in the electronic commerce system.

FIG. 10 shows a computing unit 22 that is used in the electronic commerce system of this invention. Computing unit 22 has a processor 150, a network I/O port 152, and a memory 154 which are all interconnected via an internal multi-bit bus 156. The network I/O port 152 couples the computing unit 22 to the communication system employed in the electronic commerce system. For example, the network I/O port 152 might be in the form of a modem, network card, or the like. The computing unit 22 also includes a data input apparatus 158 (e.g., a keyboard, a mouse, a trackball, a keypad, etc.) and a card reader 160 (e.g., a smart card reader, a credit card reader, etc.) which are both operatively coupled to the bus 156.

A commerce application 162 is stored in memory 154 and executable on the processor 150. The commerce application is a software program that is tailored to the particular commerce activity in which the participant is involved.

The computing system 22 also has a cryptography system which supports the commerce application 162. In the illustrated embodiment, the cryptography system is implemented in software that is stored in the memory 154 and executed on the processor 150.

Figure 11:
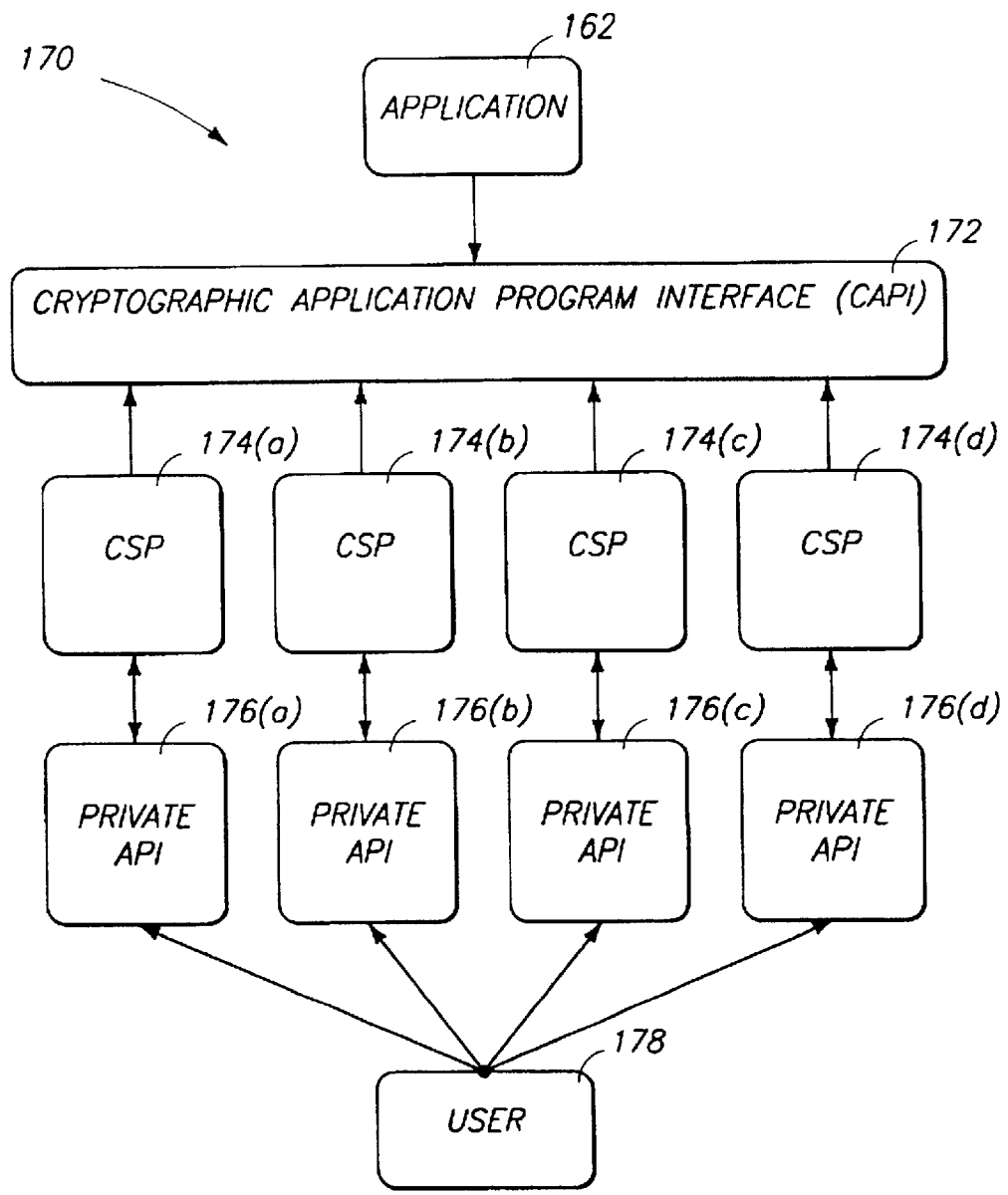
FIG. 11 is a block diagram of an architecture for a cryptography system according to yet another aspect of this invention.

FIG. 11 shows the general architecture of the cryptography system, which is referenced with numeral 170. Cryptography system 170 has three layers: (1) a cryptographic application program interface (CAPI) 172, which provides functionality to an application that it is supporting (in this case, the commerce application 162); (2) one or more cryptographic service providers (CSP) 174(a)–174(d), which implement the cryptographic functionality presented by CAPI to the application; and (3) one or more private application program interfaces (PAPI) 176(a)–176(d) which allow the CSPs to communicate directly with a user 178. As one example implementation, this cryptographic system could incorporated into an operating system as a service layer to provide cryptographic services, as is described below in more detail with respect to FIGS. 19–22.

The CAPI layer 172 itself is thin. Its principal task is to select an appropriate CSP and verify its authenticity. When the commerce application 162 needs a sequence of cryptographic functions to be performed (e.g., encryption, decryption, signing), the application invokes the CAPI 172 to acquire a context associated with the appropriate CSP. The CAPI 172 then loads the CSP and verifies its authenticity. Each CSP is digitally signed by a certified trusted authority (such as the credential binding authority) through the use of its private encryption key. This digital signature 179 is graphically illustrated in FIG. 10 as part of the CSP 174 in memory 154. The binding authority's public encryption key 180 is embedded in the CAPI 172 so that the CAPI 172 can verify the authenticity of the CSP by validating the digital signature 179 of the certified trusted authority. This verification prevents introduction of a foreign or impostor CSP. The CAPI 172 also provides an insulating layer between the application and the CSP so that the application never has direct access to the CSP, but can only call to the CSP through the CAPI.

The CAPI 172 is preferably implemented in software. As shown in the computing unit implementation of FIG. 10, the CAPI 172 is stored in memory 154 and executed on processor 150. The CAPI 172 is shown as having a CSP verifier module 181 to perform the above described CSP verification.

The CSPs 174(a)–174(d) implement the cryptographic functionality requested by the application. In general, the CSPs perform encryption key management, encryption/decryption services, authentication and key exchanging tasks, hashing routines, and digital signing. Preferably, a different CSP is configured to perform each of these functions, although a single CSP can be implemented to perform them all. The CSPs 174(a)–174(d) are dynamically accessible by the CAPI 172 using conventional loading techniques.

For the key management task, the CSP 174 has a key manager 182 (FIG. 10) that stores, generates, or destroys encryption keys of any type, including symmetric cryptographic keys and asymmetric cryptographic keys. The CSP stores the participant's signing pair of private/public keys 184 that is used to digitally sign the registration packet, commerce document, and commerce instrument. The CSP also stores the participant's key exchange pair of private/public keys 186 that is used to decrypt messages sent by other participants.

The CSP 174 has a symmetric key generator 188 which generates the random symmetric bulk data encryption keys used to encrypt the messages sent to others. These symmetric keys are preferably "sessional" and thus generated for each transaction. The CSP also imports and exports encryption keys in their encrypted form. For example, the CSP can export the symmetric encryption keys in their encrypted form when the commerce document and the commerce instrument are dispatched to the recipient. Alternatively, the CSP can import such encrypted symmetric encryption keys from another participant. The CSP can also export or import the public encryption keys of the participants signing and key exchange pairs. These public keys are the only keys that are made readily available in their non-encrypted format. After importation, the CSP treats the encryption keys as if it generated them itself. Once the symmetric keys are used and the transaction is completed, however, the CSP destroys them.

The CSP 174 is specifically designed to avoid exposing the participant's private keys to any application or user. The encryption keys are never directly accessible to the applications. The asymmetric private encryption keys are not permitted to leave the CSP under any circumstances. In addition, the symmetric keys are permitted to leave the CSP only in an encrypted state; they are not exported in a raw form. In this manner, the CSP key manager prevents the application from ever inadvertently mishandling keys in a way that might cause them to be intercepted by those to whom they were not directly sent.

The CSP key manager assigns "handles" to the various keys that are created or imported. These handles are made available to the application via the CAPI. The application can manipulate the keys indirectly using the handles, rather than having absolute control over them. However, the keys themselves remain hidden from the application and CAPI.

One or more CSPs are also provided with encryption/decryption devices which encrypt and decrypt data using previously generated or imported symmetric keys, and the asymmetric key pairs. More particularly, the CSP 174 has a symmetric key encryption/decryption device 190 which is used to encrypt and decrypt messages (such as the commerce document and commerce instrument) using the generated or imported symmetric keys. An asymmetric key encryption/decryption device 192 is also provided to encrypt and decrypt the symmetric keys using the key exchange key pair 186.

As mentioned above, another function of a CSP 174 is to perform an authentication/key exchange protocol. In this protocol, the CSP generates a symmetric key to encrypt the data and then encrypts that encryption key using the public signing key that belongs to the intended recipient. This protocol provides a high degree of security by encryting the data, and then assuring that only the intended recipient can open the encrypted packet.

The CSP 174 also has a hashing calculator 194 which computes the cryptographic digest of the data contained in any messages sent between participants. The hashing calculator 194 translates the data according to a hashing function into a fixed-size, and often reduced, hash value which is representative of the original data. Cryptographic hash functions are beneficial in that they reduce the size of data to a hash value which is unique to that data set. Additionally, according to some cryptographic hash functions, it is computationally infeasible to find two data streams with the same hash value.

The CSP 174 also performs the task of digitally signing messages sent by the participant. The CSP has a signing device 196 which provides a digital signature unique to the combination of message and participant. Preferably, the CSP signing device 196 computes the digital signature by encrypting a previously computed hash value output by the hashing calculator 194 with the private signing key pair 184.

The CSP 174 is preferably implemented in software as dynamic linked libraries (DLLs). This implementation is advantageous because it can be easily invoked by the CAPI or by the application through the CAPI. Furthermore, the cryptographic functions can be changed or updated simply by replacing one or more DLLs. With the CAPI layer in between, the CSP DLLs can be replaced without affecting how the application interacts with them. Additionally, by packaging the cryptographic services in DLLs, it will be possible to change the strengths of the services as regulatory considerations change without impacting the higher level applications.

The CSPs might also be implemented in combination with hardware. One example is a set-top box implementation having a smart card reader and installed software. Here, the cryptographic keys are stored and used only in the card processor, so that they are not even exposed to sophisticated software attacks. Another example is a combination tamper-resistant hardware (such as a smart card) and a personal computer (PC). Here, the PC might not be as trusted as the set-top box, and thus extra verification of the hardware and terminal might be necessary.

Even with the protections enforced by the CAPI 172 and the CSPs 174, there is a danger that a malicious application might attempt to request ostensibly legitimate operations that actually have the effect of compromising the user's security. For example, the application could have the CSP digitally sign a contract involving a large (and unwanted) financial commitment on the part of the user, unbeknownst to the user. Another example is for an application to instruct the CSP to export all symmetric session keys to the CSP of the application writer, giving the application writer the ability to read all of the user's encrypted data.

To guard against this threat, the CSPs have associated private application program interfaces (PAPI) 176(a)–176(d) which permits the CSPs to interact with the user through an implementation-dependent user interface. Prior to operating on a particular transaction, the PAPI 176 presents an explanation of the transaction to the user to assist the user in understanding the specifics of the transaction. This presentation might be in the form of a textual summary displayed on a monitor. The PAPI enables the user to confirm or reject the transaction by either attaching a digital signature authorizing the transaction, or avoiding signing to cancel the transaction. By involving the user each time his/her signature is to be attached to a set of commerce documents and instruments, the cryptography system mitigates the danger that a malicious application will obtain sensitive information.

The PAPI 176 also provides several other functions. One function provided by the PAPI 176 is context verification in which the PAPI 176 verifies the authenticity of the user or entity that is operating at the computing unit prior to granting that user access to the application. For instance, the PAPI might mediate a user login sequence to validate the user. Alternatively, the PAPI 176 might be implemented in hardware, such as in combination with card reader 160 which reads a smart card or PCMCIA card, to verify the cardholder. The CSP 174 checks with the PAPI 176 to ascertain whether the appropriate authentication procedures have been met between the user and computing unit before letting the commerce application acquire a context. This context verification function is particularly useful for on-line PC services or banking ATMs that require participation from a person.

This aspect of the PAPI is implementation dependent. If implemented in a software-based PC, the context verification might simply involve a check with the PC operating system for the identity of the user already logged in. In a smart card terminal implementation, a full login with PIN entry may be required.

Another function of the PAPI 176 is to enable data entry from the user. The PAPI operates in conjunction with the data input apparatus 158 to permit data entry. Examples of this function include allowing the user to input a unique PIN during context verification, or to enter information regarding the transaction, or to enter confirmation/denial commands.

The PAPI 176 also informs the user as to the state of certain keys that the user might deem as requiring higher security. For example, the PAPI 176 can be configured to consult the user each time a key is created, exported, or used. This permits the user to have some control over particular keys, while further minimizing the possibility of a malicious application from exporting the keys in raw form.

Figure 12:
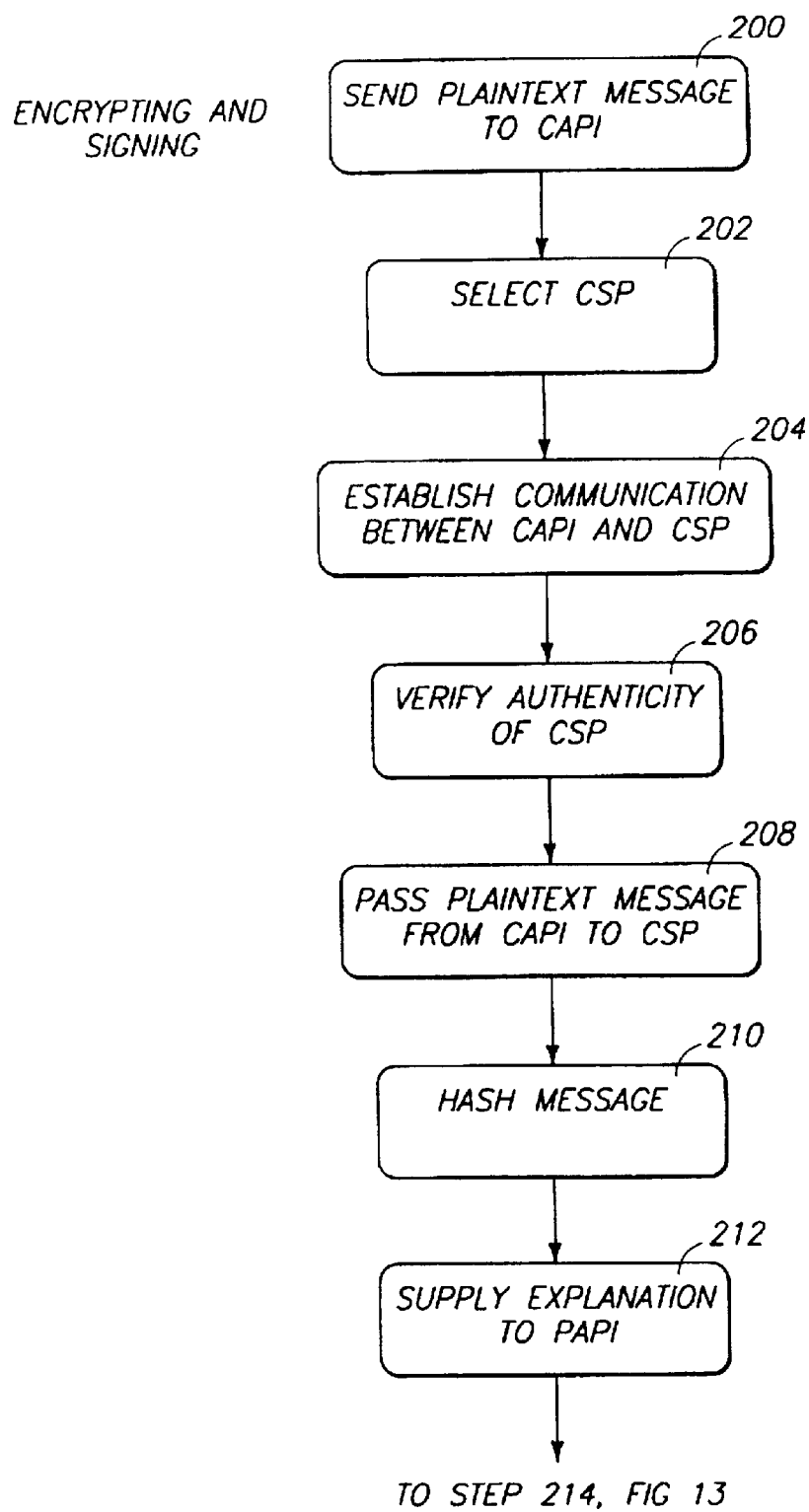
FIGS. 12–14 are a flow diagram of encrypting and signing functions performed by the cryptography system.
Figure 13:
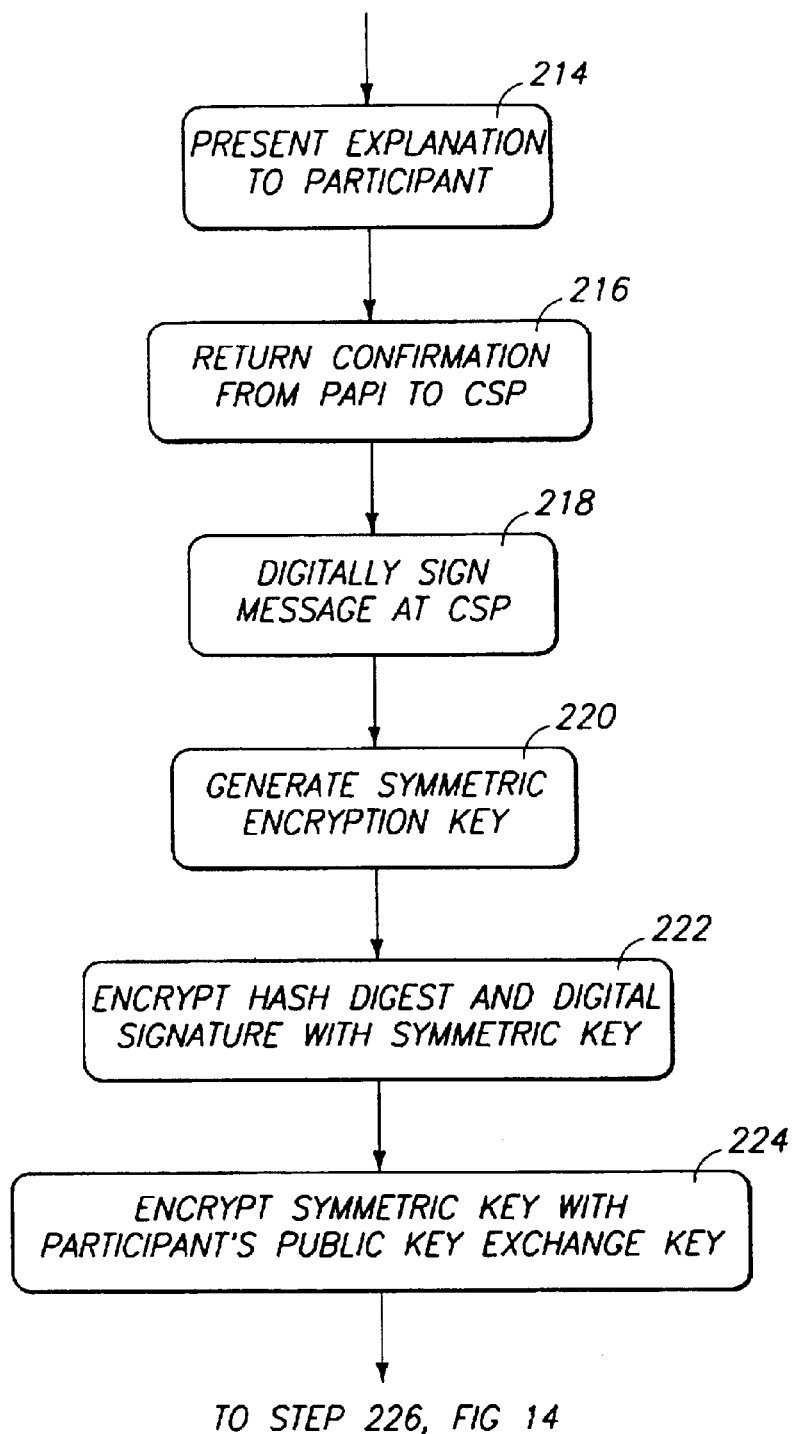
Figure 14:
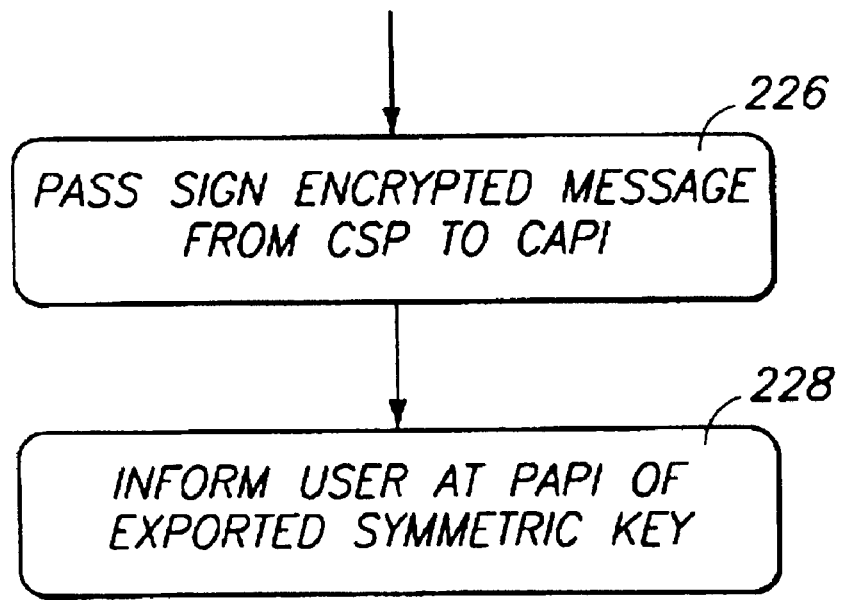
Figure 15:
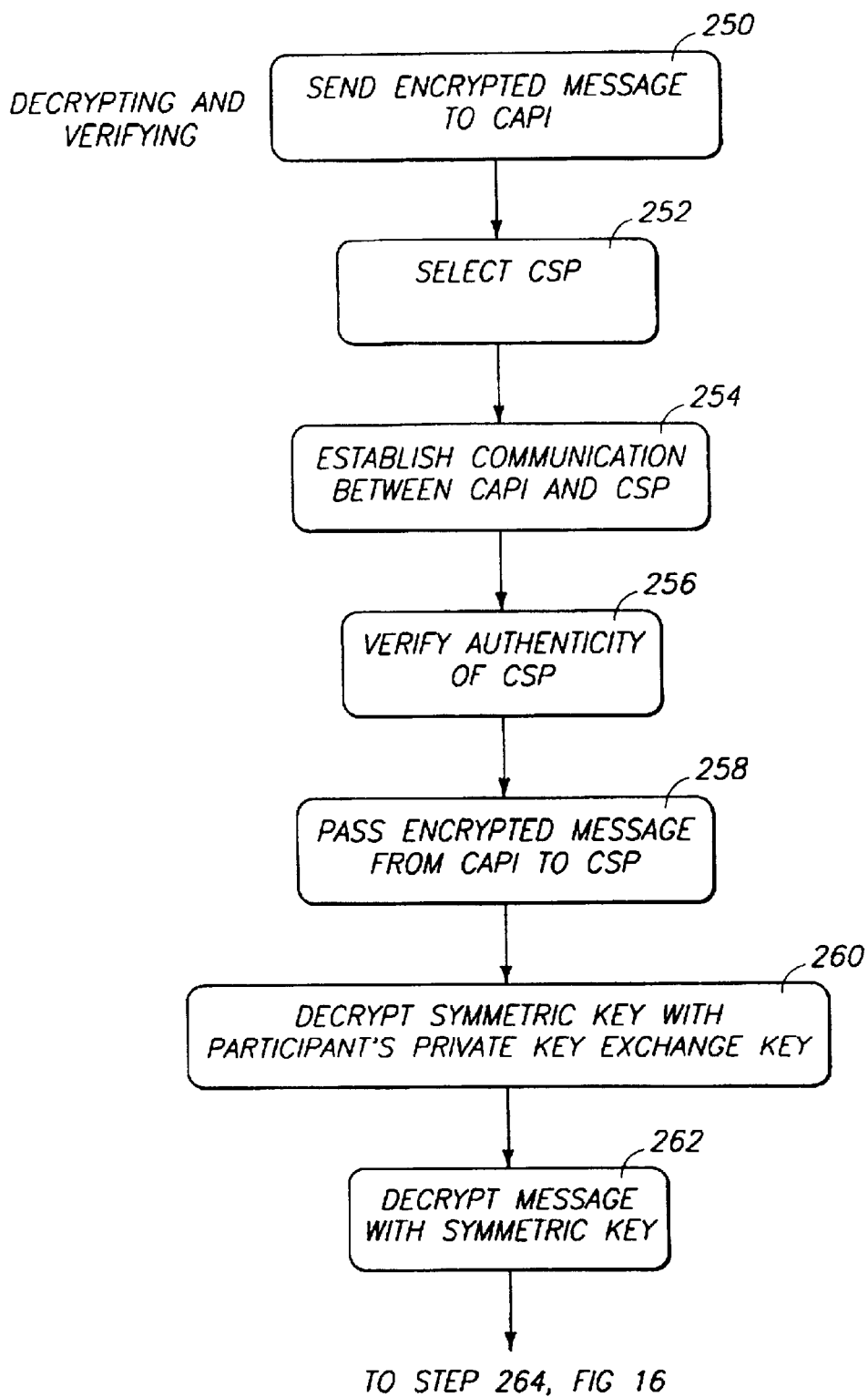
FIGS. 15–16 are a flow diagram of decrypting and verifying functions performed by the cryptography system.
Figure 16:
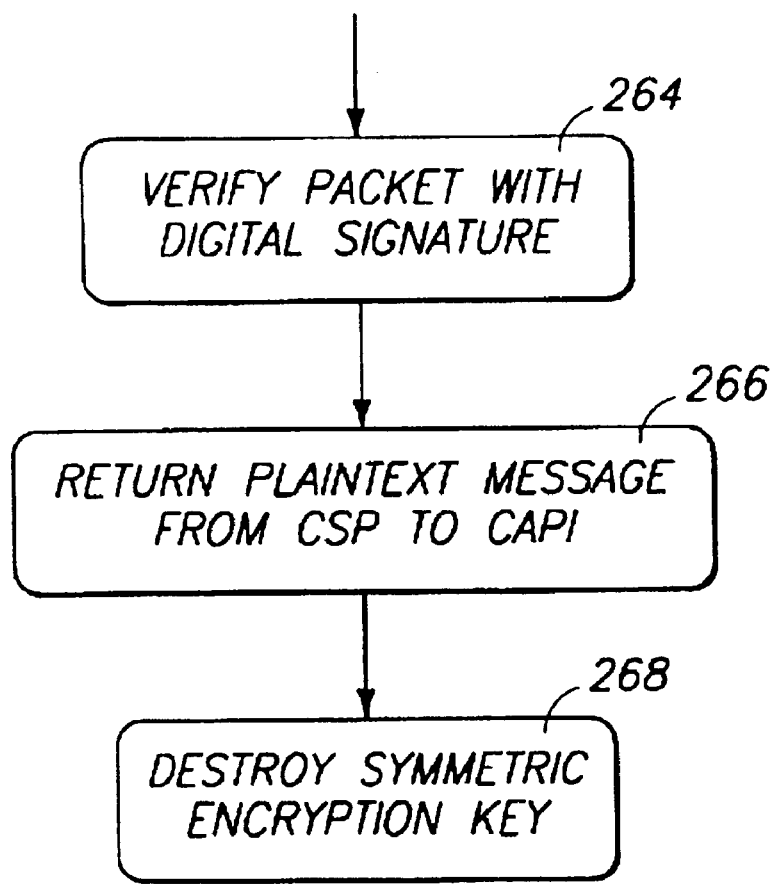

The operation of the cryptography system 170 will now be described with reference to FIGS. 12–16. Recall that each computing unit 24 is equipped with a cryptography system 170, including an originating computing unit and a recipient computing unit. For purposes of discussion, the operation will be described in two parts. A first part explains the function of the cryptography system that takes place in the originating computing unit when preparing a message for transmission (FIGS. 12–14). A second part describes the function of the cryptography system that occurs in the recipient computing unit after receiving a message (FIGS. 15–16).

Part 1: Encrypting and Signing

At step 200 in FIG. 12, the application 162 supplies a plaintext message to the CAPI 172 to be encrypted and signed. An example plaintext message is the commerce document and the commerce instrument. The CAPI 172 selects the appropriate CSP or CSPs 174 to perform the encryption and signing (step 202). In one implementation, this step entails loading the appropriate DLL, and performing a series of calls, such as calls to begin and end the encryption and to digitally sign the result. For purposes of continuing discussion, the operation will be described as if the CSP 174 in FIG. 10 is capable of performing both the encryption and signing functions.

At step 204, communication with the CSP is established between the CAPI 172 and selected CSP 174. The CAPI 172 verifies the authenticity of the CSP 174 by validating the binding authority's digital signature 179 attached to the CSP 174 using the binding authority's public signature key 180 embedded in the CAPI 172 (step 206).

Once the CSP is authenticated, the CAPI 172 passes the plaintext message to the CSP 174 for encryption (step 208 in FIG. 12). The CSP hashing calculator 194 translates the plaintext message into a cryptographic digest (step 210 in FIG. 12). During this time, an explanation of the transaction (such as what the commerce document or commerce instrument include) is passed to the PAPI 176 (step 212 in FIG. 12). The PAPI 176 supports a user interface which presents the explanation to the user 178 (step 214 in FIG. 13) and allows the user to input commands which confirm, modify, or deny the transaction. This affords an opportunity for the user to make changes to the transaction at its inception, before involving other participants. For example, the user might wish to change a purchase order or alter how he/she expects to pay for the purchased items. From a security perspective, this user interface ensures that the user is aware of the transaction and that he/she is authorizing it.

If the user authorizes the transaction, the PAPI 176 returns a confirmation to the CSP 174 (step 216 in FIG. 13). At step 218, the CSP signing device 196 attaches the originator's digital signature to the message by encrypting the cryptographic digest (hash) using the originator's private key of the signing pair. The CSP symmetric key generator 188 generates a symmetric bulk data encryption key (step 220 in FIG. 13) and the CSP symmetric key encryption/decryption device 190 encrypts the message and the originator's digital signature using the new symmetric encryption key (step 222). At step 224, the CSP asymmetric key encryption/ decryption device 192 encrypts the symmetric encryption key using the key exchange public key of the intended recipient that is imported to the CSP.

At step 226 in FIG. 14, the CSP 174 returns the signed and encrypted commerce document and commerce instrument to the CAPI 172, and then onto the application. At the same time, the CSP 174 can inform the user via the PAPI 176 that certain keys, such as the symmetric key, are being exported from the CSP in its encrypted format (step 228 in FIG. 14). However, the asymmetric private keys of the signing and key exchange pairs are not exported from the CSP, but are permanently retained in confidence within the CSP. The commerce instrument and commerce instrument are then ready for transmission from the originating computing unit to the recipient computing unit as described above.

Part 2: Decryption and Verification

The commerce application running at the recipient computing unit receives the signed encrypted document and instrument and passes the package to its own cryptography system 170. Particularly, the encrypted document and instrument are supplied to the CAPI 172 for purposes of being decrypted and verified (step 250 in FIG. 15). The CAPI 172 selects the appropriate CSP or CSPs 174 to perform the decryption and verification (step 252 in FIG. 15). In this implementation, the appropriate CSP DLL is loaded and the application performs a series of calls to the DLL through the CAPI. For discussion purposes, the operation will again be described as if the CSP 174 in FIG. 10 is capable of performing both the decryption and authentication functions at the recipient computing unit.

Communication is then established between the CAPI 172 and selected CSP 174 (step 254 in FIG. 15), and the CAPI 172 verifies the authenticity of the CSP 174 (step 256). Once the CSP is authenticated, the CAPI 172 passes the encrypted document and instrument to the CSP 174 for decryption (step 258). At step 260, the CSP asymmetric key encryption/decryption device 192 decrypts the symmetric encryption key using the recipient's private key exchange key 186 maintained in the CSP. The CSP symmetric key encryption/decryption device 190 uses the recovered symmetric key to decrypt the message and originator's digital signature to provide the signed cryptographic digest (hash) (step 262 in FIG. 15).

At this point, the CSP can verity the packet by decrypting the cryptographic digest (hash) using the originator's public signing key (step 264 in FIG. 16). If the decryption yields a result that compares bit-for-bit with an independently, locally computed hash of the entire message, the participant is assured that the packet came from the originator and was not subsequently altered. For instance, in the electronic commerce system described above, the first recipient participant would be able to decrypt the commerce document, but decryption of the commerce instrument would yield meaningless information.

The plaintext message is returned from the CSP to the CAPI 172 and then to the commerce application 162 (step 266 in FIG. 16). After the process is completed, the CSP destroys the symmetric encryption key for that session (step 268).

EXAMPLE IMPLEMENTATION

The above discussion presents a general structure of an electronic commerce system. The following two cases provide example implementations of the electronic commerce system in specific commerce environments. The first example implementation is a credit card system and will be described with reference to FIGS. 17 and 18. The second example implementation is an interactive television system and will be described with reference to FIG. 23. In addition to these specific examples, the electronic commerce system can be implemented in a wide variety of commercial environments, including on-line services and debit or other banking card transactions.

Example 1

Credit Card System

Figure 17:
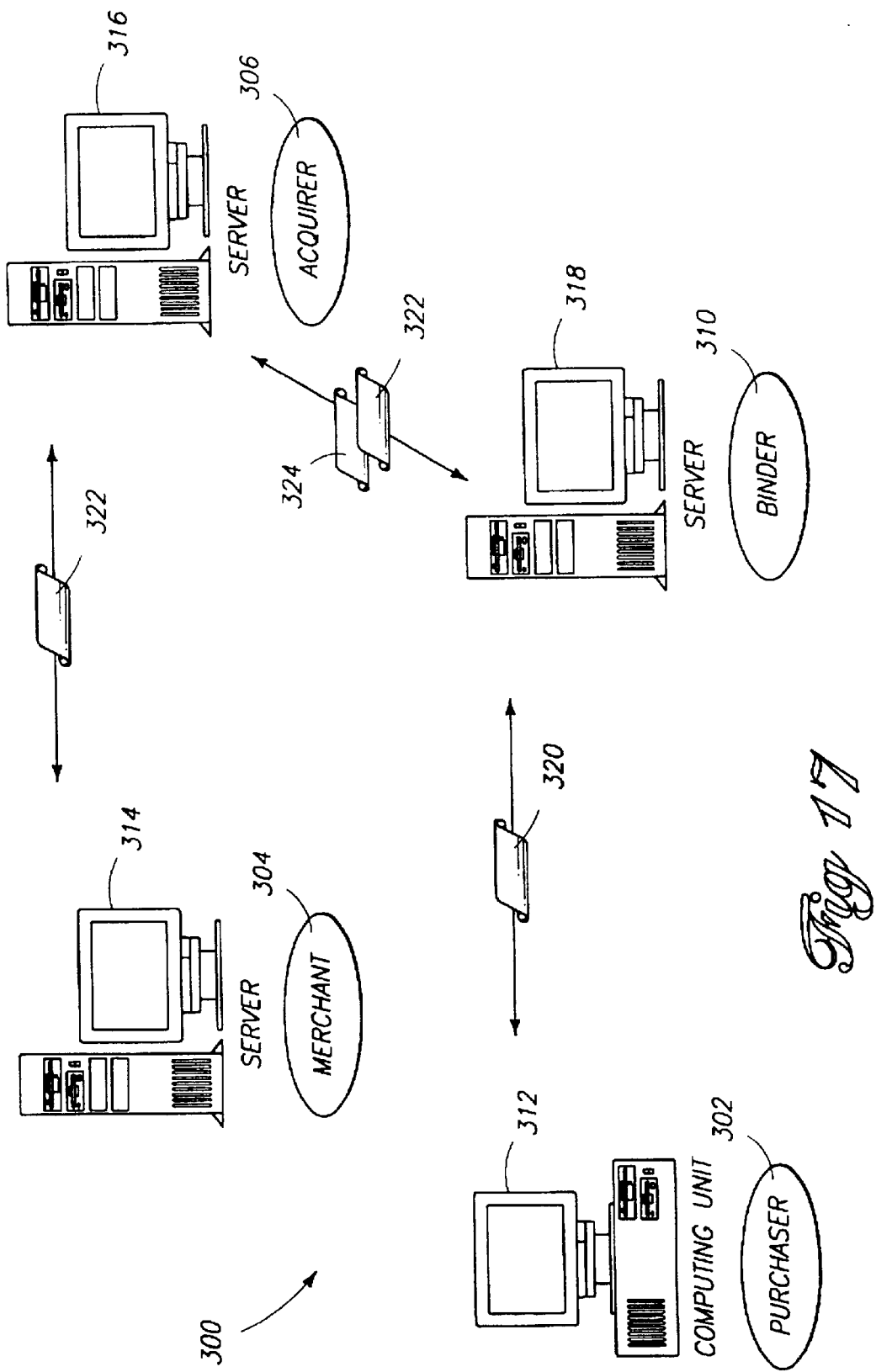
FIG. 17 is a schematic of the electronic commerce system embodied as a credit card system according to another aspect of this invention.
Figure 18:
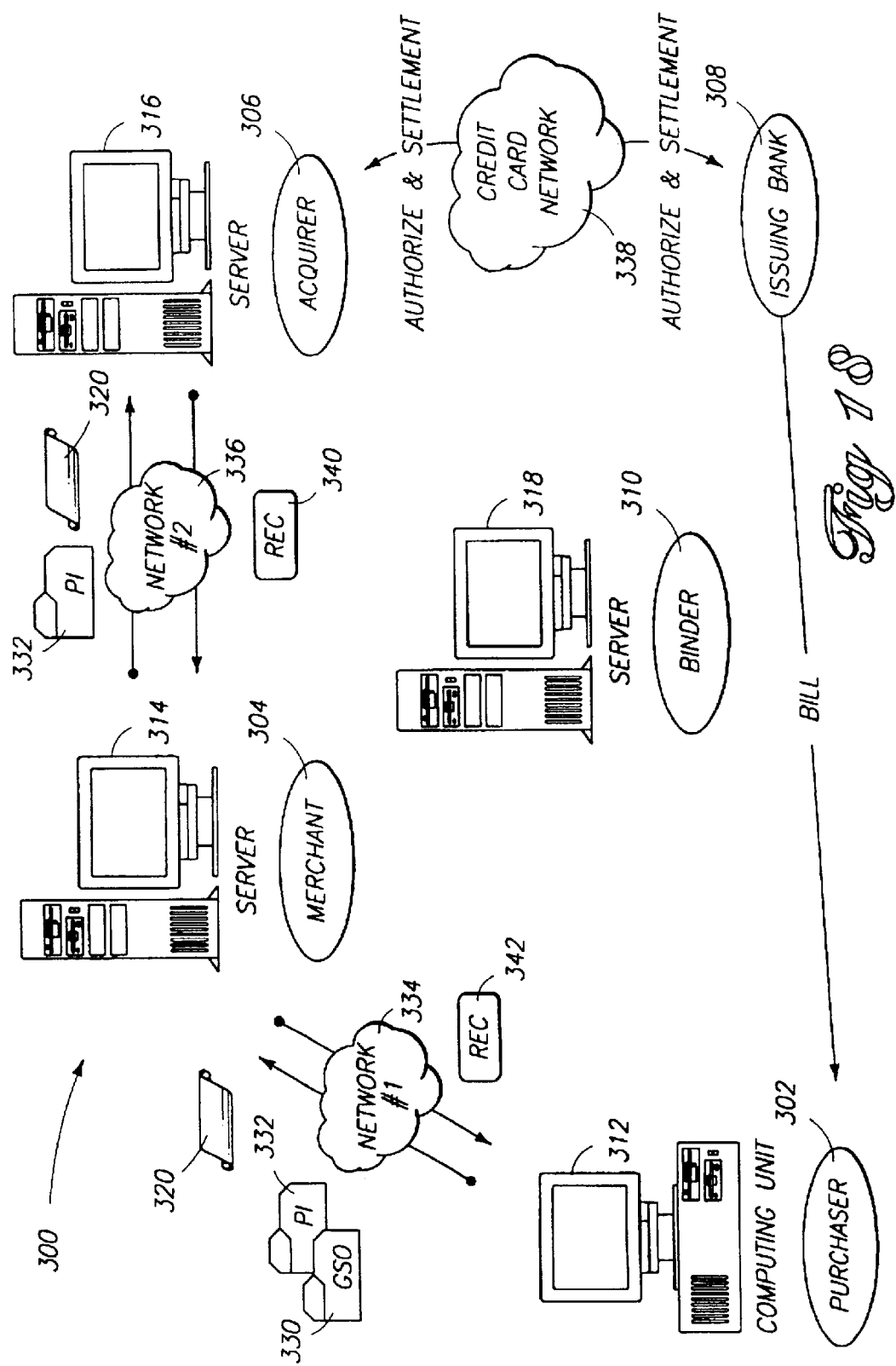
FIG. 18 is a schematic of the credit card system during the transaction phase.

FIGS. 17 and 18 diagrammatically illustrate an electronic credit card system 300 according to two different operation phases: a registration phase (FIG. 17) and an order and purchase processing phase (FIG. 18). The electronic credit card system 300 has several participants, including a purchaser 302, a merchant 304, an acquiring bank or acquirer 306, an issuing bank 308, and a trusted authority or binder 310. The financial roles of each participant in the commerce transaction are well-known and will not be described herein.

Each participant is equipped with a computing unit, including a PC 312 at the purchaser and servers 314, 316, and 318 at the merchant, acquirer, and binder, respectively. Each computing unit is loaded with a credit card application and a cryptography system to support the credit card application with respect to its cryptographic needs.

During the registration phase of FIG. 17, each participant requests and receives credentials from the binder 310. "Binding" in this context means that the acquirer 306 is a known interface to an existing card payment system that is in use today; the merchant 304 is known to be able to accept credit cards for payment and deposit them with the acquirer 306, and the purchaser 302 has a payment card known by the issuing bank 308 that issued the card. Credentials for the acquirer 306 and the merchant 304 are created by the binder 310 as authorized by their responsible bank. Credentials for the purchaser are created by the binder 310 as authorized by the purchaser's bank or authorized agent in the form of the card association.

Cardholder credentials are created when the purchaser 302 requests registration of a credit card. The purchaser enters card information (such as card number, expiration date, name on card) on the PC 312 to complete a registration application. The purchaser's computing unit also uses its cryptography system to generate the signing and key exchange pairs of public/private cryptography keys. The public keys are included in the registration packet.

The purchaser's computing unit digitally signs the card registration packet and sends the packet over a communication system to the binder's server 318. The binder's server 318 validates the registration packet and creates a cardholder credential based on the information supplied by the purchaser. The cardholder credential includes the following information:

---

Cardholder Credential

1. Credential Serial Number.
2. Cardholder Name.
3. Hashed Account Number.
4. Cardholder's Signing Public Key.

| Cardholder Credential |
| --- |
| 5. Cardholder's Key Exchange Public Key.
6. Credential Expiration.
7. Version of Credential Format.
8. Encryption Index |

The "credential serial number" is a number generated by the binder to uniquely identify the credential. The "hashed account number" is created using a one-way hashing algorithm, such as the well-known SHA (secure hash algorithm), which easily creates a unique hash value representative of the account number while rendering the regeneration of the account number from the hash value computationally infeasible. The hash guarantees that the credential is tied to a specific credit card. However, knowledge of the credential does not give any insight to the actual number of the credit card. The "credential expiration" field contains the date range that the credential is valid as decided by the binder.

The cardholder credential is signed by either the binder 310, which might be the card association binder, or the card issuing bank binder in those cases where the card association has authorized the card issuing bank to do so. This credential is then sent back over the communication path from the binder's server 318 to the purchaser's computing unit 312 as indicated by the credential 320 in FIG. 17.

Notice that the acquirer 306 registers with the binder 310 for both itself and on behalf of the merchant 304. In the credit card context, the merchant 304 participates based upon the authority of the merchant's financial institution, which is the acquirer 306 in this case. As a result, there is information known only to the acquirer that will be included in the merchant's credential. The binder will create both credentials 322 and 324 for the merchant and acquirer and send both to the acquirer, which then passes the merchant's credential 322 onto the merchant. Alternatively, if authorized, the acquirer can create the merchant's credential directly.

The merchant's credential is conceptually similar to the cardholder credential. There are eleven fields contained in the merchant's credential, with the first six fields being analogous to fields in the cardholder credential. The merchant's fields are:

| Merchant Credential |
| --- |
| 1. Credential Serial Number.
2. Merchant Name.
3. Merchant's Signing Public Key
4. Merchant's Key Exchange Public Key
5. Period of Credential Validity.
6. Version of Credential Format.
7. Acquirer's Key Exchange Public Key (for payment instructions)
8. Card Brand Accepted
9. Acquirer BIN
10. Merchant ID
11. Encryption Index |

The last four fields are used to help define the business relationships and responsibilities that are inherent in the credit card model. The "acquirer's key exchange public key" is included to enable encryption of the payment instruction by the purchaser such that only the acquirer may decrypt it. The acquirer's public key could be distributed directly to the purchaser via the acquirer's credential, but is preferably included in the merchant's credential in the interest of efficiency and in recognition of the special business relationship between the acquirer and the merchant.

The "card brand accepted" field indicates the particular card brand (e.g., Visa®) or MasterCard® that can be accepted by the merchant. The "acquirer BIN" is the identifier of the acquirer as used by the card association. The "merchant ID" is the identifier of the merchant as used by the acquirer. The cardholder's credential is signed by the card association binder or the acquirer if authorized by the binder.

The acquirer credential contains items similar to the purchaser or merchant credentials, including the following:

| Acquirer Credential |
| --- |
| 1. Credential Serial Number.
2. Acquirer Name.
3. Acquirer's Signing Public Key
4. Acquirer's Key Exchange Public Key
5. Credential Expiration.
6. Version of Credential Format.
7. Acquirer BIN
8. Card Brand Accepted |

The acquirer credential is digitally signed by the credit card association's credential binding authority.

Turning now to the order and purchase processing phase of FIG. 18, the credit card system implemented with the electronic commerce system of this invention involves the communication paths shown in solid lines. The electronic credit card system of this invention facilitates the document and instrument interchange among the purchaser 302, merchant 304, and acquirer 306. The dotted lines represent commerce processes implemented and operating by the existing payment card authorization and settlement systems in use today. As noted above, the purchaser PC 312, merchant server 314, and acquirer server 316 all execute a credit card order and payment application, and a cryptography system, to meet the security, privacy, integrity, and authenticity needs of this particular commerce system. During the order and processing phase, there is no active participation on the part of the binder 310.

The purchaser 302 creates a commerce document in the form of a goods and services order (GSO) and a commerce instrument in the form of a purchase instruction (PI). The GSO and PI are configured in packets using the tag-length-value data structure described above with reference to FIG. 9. An example GSO contains a name of the payee (merchant), an authorized amount, a unique transaction ID, purchaser's name and address, an order expiration, and an order form. An example PI includes the payee name (merchant), the authorized amount, the unique transaction ID, a GSO message digest, a card expiration, and order expiration.

The GSO and PI are digitally signed by the purchaser using the appropriate cryptographic service provider (CSP) in the cryptography system. The GSO and PI are then encrypted with a symmetric cipher using two different, randomly selected symmetric keys. The GSO data requires relatively less privacy (in comparison to the PI) because it contains less financial information. Thus, the GSO can be encrypted with a symmetric key of comparatively less strength, such as a key devised by the known RC4 algorithm with a key length of 40 bits. On the other hand, the PI contains more financial information and warrants higher privacy. The PI is encrypted with a DES symmetric key having a key length of 56 bits.

The symmetric keys for the GSO and PI are next encrypted with the key exchange public keys of the merchant and acquirer, respectively. The GSO symmetric key is less stringently protected by a relatively smaller 768-bit RSA public key, whereas the PI symmetric key is more strongly protected using a 1024-bit RSA key.

The signed encrypted GSO 330, signed encrypted PI 332, and the cardholder credential 320 are packaged and sent to the merchant over a communication network 334. An example network 334 include a telephone network.

The merchant server 314, using its cryptography system, decrypts the GSO 330 using its own key exchange private key. The merchant server 314 then uses the purchaser's public signing key received in the cardholder credential 320 to verify the purchaser's digital signature on the GSO. This assures the merchant that the purchaser is authentic and the order is valid. Meanwhile, unable to decrypt the PI 332, the merchant server 314 leaves the PI in its encrypted form.

To consummate the transaction, the merchant needs to secure funds from the purchaser to pay for the ordered items. Accordingly, the merchant server 314 sends the still encrypted PI 322 and the purchaser's credential 320 onto the acquirer server 316 using the same or another communication network 336. An example network 336 might be an ISDN network which links the merchant and acquirer.

Using its cryptography system and own private key exchange key, the acquirer server 316 decrypts the PI 332. The acquire server 316 then uses the purchaser's signing public key received in the purchaser's credential 320 to verify the purchaser's digital signature on the PI.

The PI is channeled through the existing payment card authorization system to validate the availability of funds for the purchaser. More particularly, the acquirer 306 uses the existing credit card network 338 to contact the issuing bank 308 that issued the credit card and handles that credit account for the purchaser 302. If sufficient credit or funds are available, the issuing bank 308 returns an authorization response over the network 338 to the acquirer 306. The authorization response is then digitally signed by the acquirer 306 and encrypted using the key exchange public key of the merchant. The response 340, along with the acquirer's credential 324, is sent over the communication network 336 to the merchant server 314.

The merchant server 314 uses its cryptography system and private key exchange key to decrypt the response 340 and the acquirer's public signing key received in the acquirer's credential 324 to verify the response. Given the signed authorization, the merchant knows that payment is guaranteed. The merchant can now fill the order and ship the items to the purchaser. The merchant server 314 then generates a purchase receipt 342, digitally signs the receipt, and encrypts it using the purchaser's public key exchange key. The purchase receipt 342 is sent from the merchant server 314 over the communication network 334 to the purchaser's PC 312 which then decrypts and verifies the receipt.

At the close of the merchant's business day, the merchant 304 requests payment for all approved payments for which goods have been shipped. The merchant server 314 transmits a file of all such payment transactions processed that day to the acquirer for decryption and deposit into the normal draft clearing and settlement system used today. The acquirer pays the merchant and then settles its account with the issuing bank using the existing credit card system 338, and the issuing bank bills the purchaser in due course.

Figure 20:
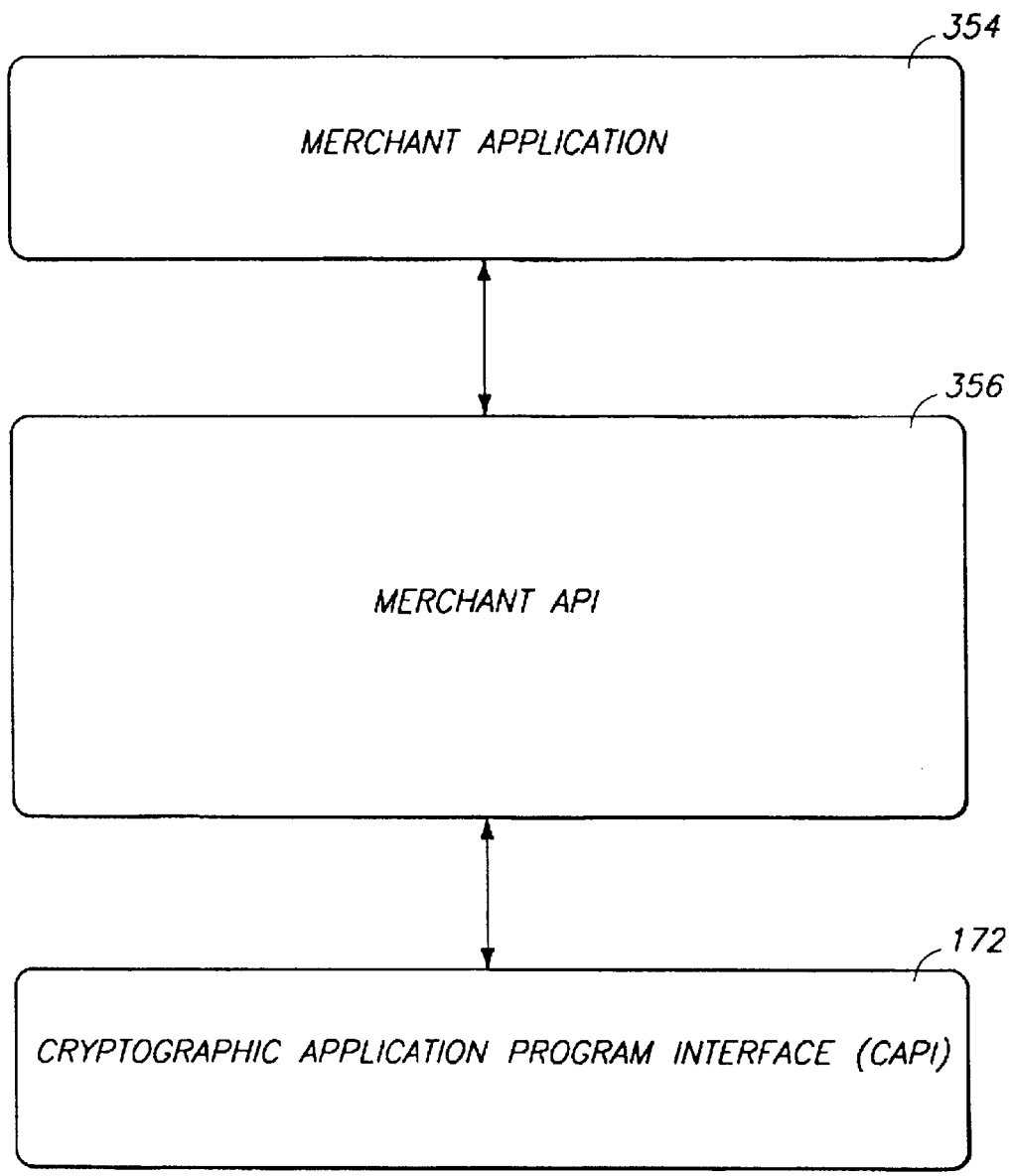
Figure 21:
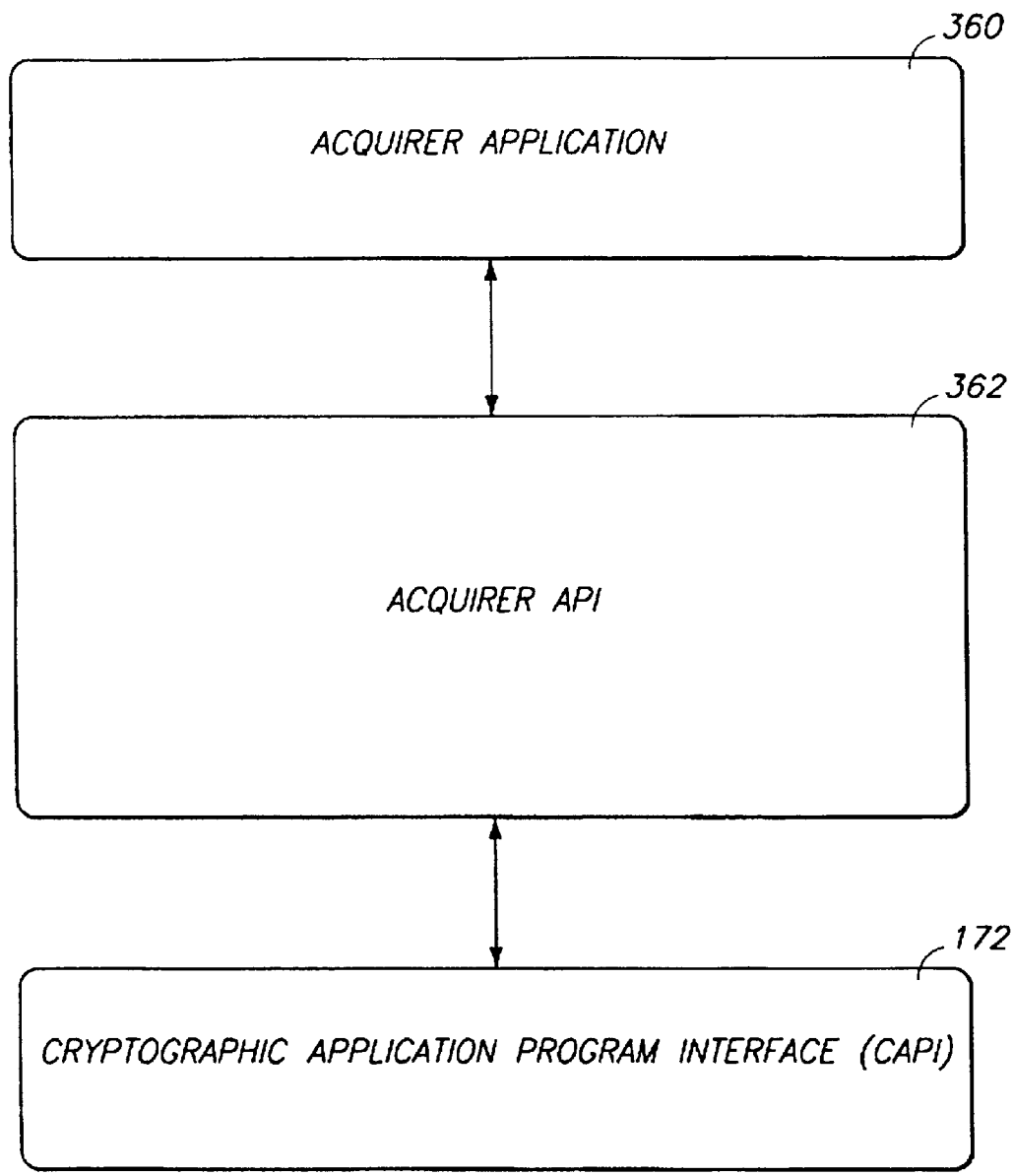
Figure 22:
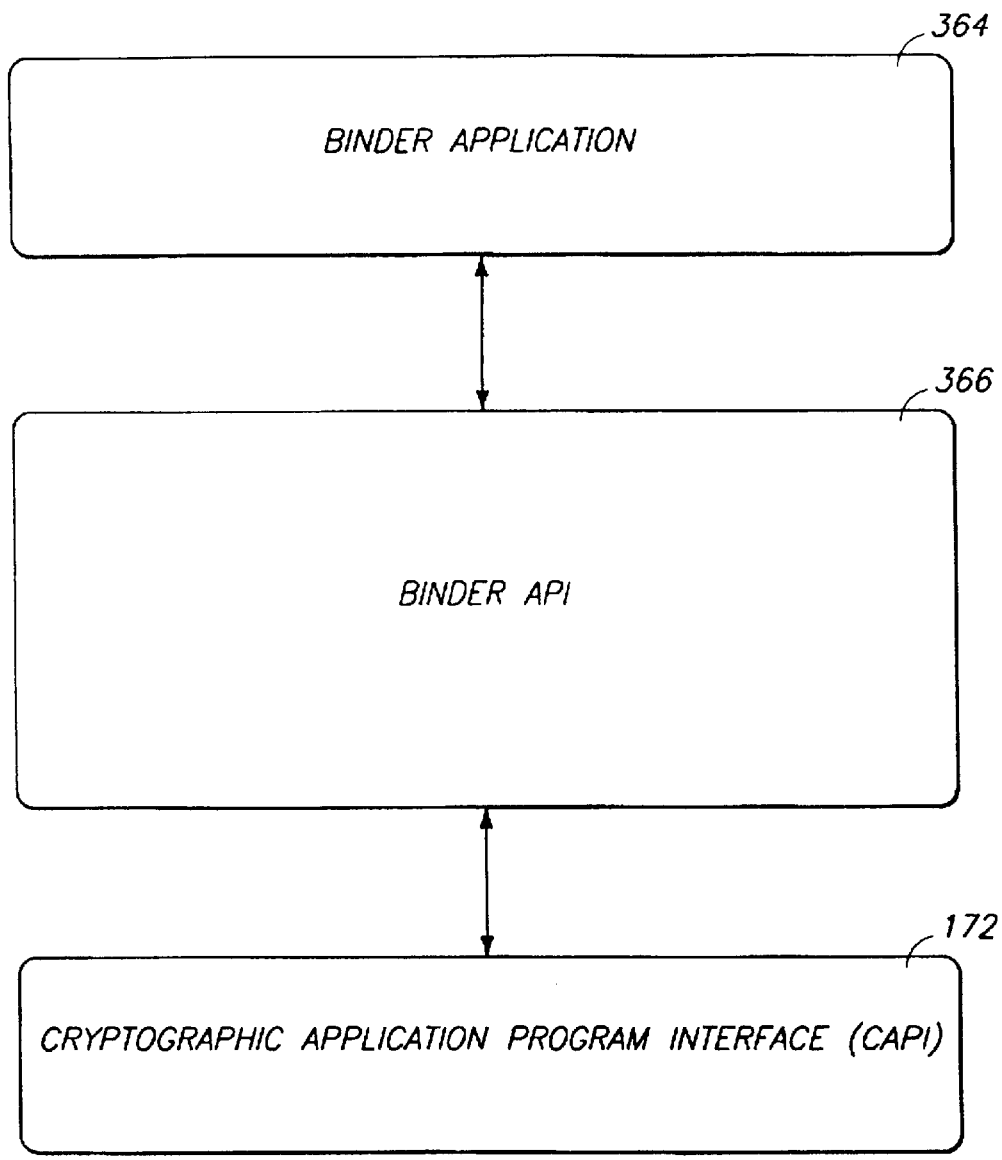

FIGS. 19–22 illustrate more particularly the use of the cryptography system as a lower-level service provider to an operating system application that is tailored for the purchaser (FIG. 19), the merchant (FIG. 20), the acquirer (FIG. 21), and the binder (FIG. 22). For convenience purposes, only the CAPI layer of the cryptography system is illustrated in these Figures.

Figure 19:
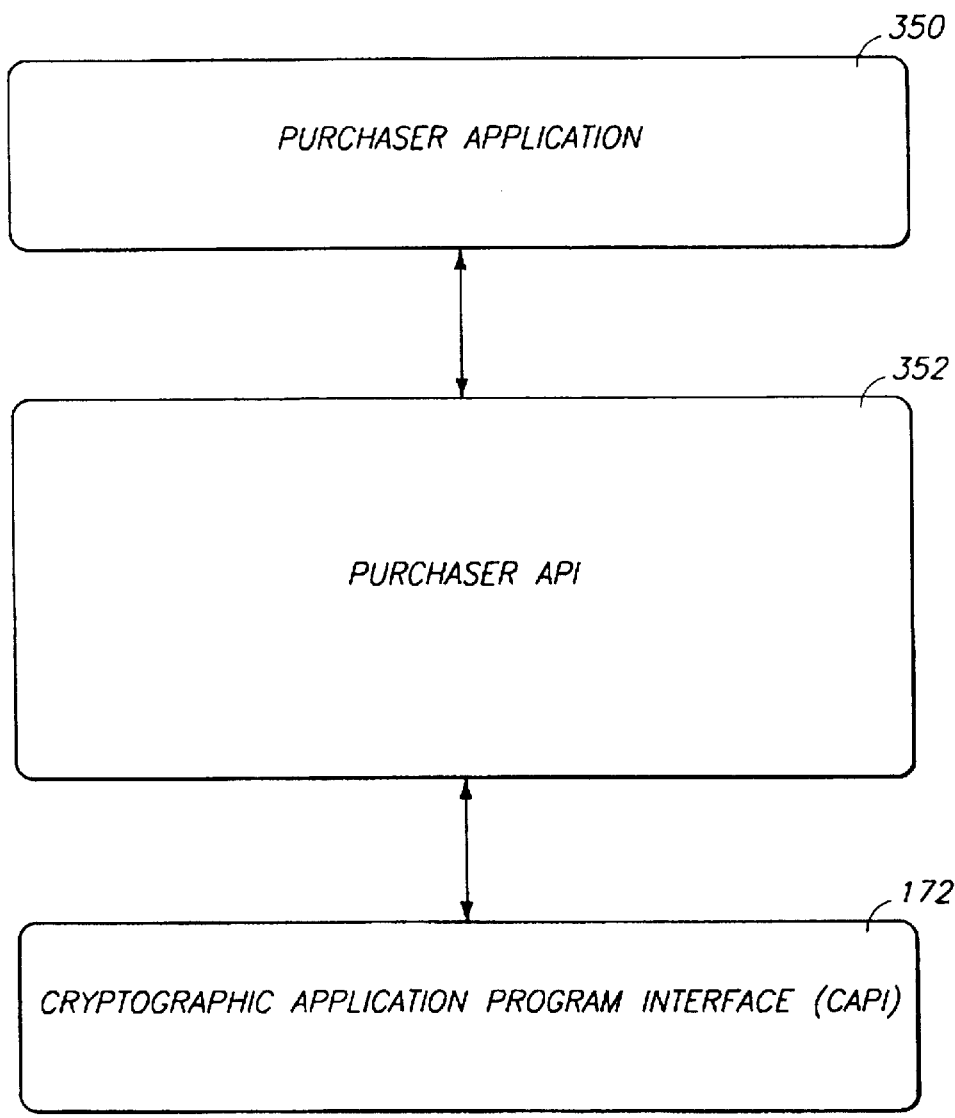
FIGS. 19–22 are block diagrams depicting the FIG. 11 cryptography system as a service layer to operating system applications resident at a purchaser, merchant, acquirer, and binder participants of the FIG. 18 credit card system.

As shown in FIG. 19, a purchaser application 350 running at the purchaser PC 312 calls functions in a purchaser application program interface (API) 352 which then calls functions in the CAPI 172 of the cryptography system. The purchaser application 350 might request, for example, creation of a registration request, creation of a transaction, or processing of a transaction receipt. To create a registration request during the registration phase, the purchaser application 350 submits the binder credential and the purchaser's account number and the purchaser API returns a credential registration request. This request is properly signed and encrypted by the underlying cryptography system in the manner described above with respect to FIGS. 10–14. As another example, to create a transaction, the purchaser application 350 passes a charge slip, a summary, the merchant credential, a transaction amount, purchase terms, and transaction details to the purchaser API 352, which then returns a transaction and an identifier for that transaction.

Table 2 shows an example set of API function calls, listing input terms which are supplied from the purchaser application to the purchaser API and returned items sent back from the purchaser API.

TABLE 2

Purchaser API Function Calls

| Function | Input Terms | Returned Terms |
|---|---|---|
| Create Credential Registration Request | Binder Credential Account Number | Request |
| Process Credential Registration Response | Registration Response | |
| Create Transaction | Charge Slip Summary Merchant Credential Transaction Amount Purchase Terms Transaction Details | Transaction Transaction Identifier |
| Process Transaction Receipt | Receipt | Amount Transaction Identifier Merchant Name Merchant Message |

With respect to FIG. 20, a merchant application 354 running at the merchant server 314 calls functions in a merchant API 356 which then calls functions in the CAPI 172 of the cryptography system. Table 3 shows an example set of function calls for the merchant API.

TABLE 3

Merchant API Function Calls

| Function | Input Terms | Returned Terms |
|---|---|---|
| Create Credential Registration Request | Binder Credential Account Number | Request |
| Process Credential Registration Response | Registration Response | |

TABLE 3-continued

Merchant API Function Calls

| Function | Input Terms | Returned Terms |
|---|---|---|
| Process Transaction | Transaction | Charge Slip<br>Transaction Amount<br>Purchase Terms<br>Transaction Identifier<br>Transaction Details<br>Purchaser Credential |
| Create Transaction Authorization Request | Transaction Auth. Amount<br>Transaction Identifier<br>Charge Slip<br>Acquirer Credential | Transaction Auth. Request |
| Process Transaction Authorization Response | Transaction Auth. Response | Transaction Auth. Identifier<br>Authorized Amount<br>Transaction Auth. Response Code<br>Acquirer Message to Purchaser |
| Create Transaction Receipt | Authorized Amount<br>Transaction Identifier<br>Merchant Name<br>Merchant Message<br>Purchaser Credential<br>Acquirer Message to Purchaser | Receipt |

With respect to FIG. 21, an acquirer application 360 running at the acquirer server 316 calls functions in an acquirer API 362 which then calls functions in the CAPI 172 of the cryptography system. Table 4 shows an example set of function calls for the acquirer API.

TABLE 4

Acquirer API Function Calls

| Function | Input Terms | Returned Terms |
|---|---|---|
| Create Credential Registration Request<br>Process Credential Registration Response | Binder Credential<br>Account Number<br>Registration Response | Request |
| Process Transaction Authorization Request | Transaction<br>Authorization Request | Transaction Auth. Identifier<br>Transaction Identifier<br>Transaction Amount<br>Transaction Auth. Amount<br>Purchaser Name<br>Purchaser Account Number<br>Merchant Account Number<br>Summary<br>Purchaser Credential<br>Merchant Credential |
| Create Transaction Authorization Response | Transaction Auth. Identifier<br>Transaction Identifier<br>Authorized Amount<br>Purchaser Credential<br>Merchant Credential<br>Trans. Authorized Response Code | Transaction Auth. Response |

With respect to FIG. 22, a binder application 364 running at the binder server 318 calls functions in a binder API 366 which then calls functions in the CAPI 172 of the cryptography system. Table 5 shows an example set of function calls for the binder API.

TABLE 5

Binder API Function Calls

| Function | Input Terms | Returned Terms |
|---|---|---|
| Process Credential Registration Request | Request | Requester Type<br>Requester Name<br>Requester Account Number<br>Requester Signature Public Key<br>Requester Key Exchange Pub. Key |
| Create Credential Registration Response | Credential Type<br>Requester Name<br>Requester Account Number<br>Binder Name<br>Validity Period<br>Requester Signature Public Key<br>Requester Key Exchange Pub. Key<br>Credential Identifier | Credential Regis. Response<br>Requester Credential |

Example 2

Interactive Entertainment System

FIG. 23 diagrammatically illustrates an interactive television (ITV) system 400 that implements the electronic commerce system according to another aspect of this invention. The participants include a subscriber 402, a merchant 404, an acquire 406 and a cable operator 408. The subscriber 402 is equipped with a computing unit in the form of a set-top box (STB) 412. The merchant and acquirer each have a server 414 and 416, respectively, and the cable operator 408 is equipped with a headend server 418. Each computing unit is loaded with an ITV commerce application and a cryptography system to satisfy the security, privacy, integrity, and authenticity aspects of the ITV system. In this implementation, the ITV commerce application can be downloaded from the headend server to the STBs as requested, rather than remaining resident at the STB. The cryptography system, however, would reside and be executable at the STB.

The subscriber STB 412 and merchant server 414 are interconnected with the headend server 418 via an interactive network structure, which is represented by the network cloud 420. One example implementation of the network structure is a hybrid fiber-optic/cable distribution system employing digital switching technologies such as asynchronous transfer mode (ATM) for bi-directional communications between the headend and individual subscriber/merchants. This multi-tier distribution system includes a high-speed, high-bandwidth fiber optic cable coupled between the headend and many regional distribution nodes. Each distribution node is then connected to multiple set-top boxes within the region via conventional home entry lines, such as twisted-pair telephone lines or coaxial cable. As an example, a single headend might service 250,000 or more subscribers, and each regional distribution node might support approximately 1200 subscribers. As technology continues to improve, parts of the ITV network structure can be replaced with wireless forms of communication, such as RF communication or satellite communication.

In this implementation, the cable operator 408 might perform several roles. The headend server 418 performs its traditional tasks of providing video content programs to the subscribers and facilitating communication over the network 420. The cable operator 418 might also operate as the binding authority which certifies all subscribers connected to the ITV network, including the purchasing subscriber and the merchant subscriber. In this fashion, the subscribers submit registration applications over the ITV network 320, and receive credentials from the headend server 418. The cable operator 418 might also function as a financial institution analogous to an issuing bank in the credit card system, wherein the cable operator bills and collects money from the subscribers.

During a purchasing transaction, the purchaser subscriber 402 creates a commerce document in the form of an electronic purchase order (PO) 422 and a commerce instrument in the form of a purchase instruction (PI) 424. The PO and PI are digitally signed by the purchaser subscriber STB, encrypted with selected symmetric keys that are then encrypted with the public key exchange keys of the merchant 404 and acquirer 406, respectively. The signed encrypted PO 422, signed encrypted PI 424, and a subscriber credential 426 are packaged and sent over the interactive network 420 to the headend server 418, which then redirects it to the merchant subscriber 404.

The merchant 404 decrypts and verifies the PO 422. The merchant 404 then sends the encrypted PI 424 and the purchaser subscriber's credential 426 onto the acquirer 406 via a separate communication network 428. The acquirer server 416 decrypts and verifies the PI 424. The acquirer determines whether the funds exist to consummate the purchase and, if so returns a signed authorization receipt 430 to the merchant. The merchant then fills the order and sends a signed receipt 432 to the subscriber.

Once the goods are shipped, the merchant 404 requests and receives payment for the goods from the acquirer. The acquirer then settles the account with the purchaser's issuing bank, or the cable operator 408 if authorized to perform that function.

The example embodiments illustrate several benefits of the electronic commerce system. First, each document or instrument is digitally signed and encrypted by an originating participant. This insures that the document and instrument will be decrypted and the signature independently verified only by the intended recipient participant. The recipient further verifies that the digital signature is valid for the document or instrument, and that the document or instrument was part of the initial package created by the originating participant and was not subsequently altered.

Another benefit is that the encrypted and signed packages are independent entities that can be transported by any communication protocol and system. This allows the electronic commerce system to operate over the communication system that already exists between the participants, such as phone networks, on-line services networks, wide area networks, interactive television networks, etc.

Another advantage is that the encryption attributes can be varied according to document type. In the credit card example, the GSO and PI are encrypted using independently specifiable cryptographic algorithms and strengths (often expressed in terms of key sizes or bit count). Regulatory and legal entities can therefore set the standards of allowable encryption for each document or instrument within a particular commerce system. The electronic commerce system according to an aspect of this invention can then be flexibly adapted to conform to those standards. In this manner, the electronic commerce system can be used in a wide variety of commerce activities, and support the particular regulatory and legal cryptographic standards imposed for each different activity. Furthermore, by implementing the cryptography system, and namely the cryptographic service providers (CSPs) as DLLs, the electronic commerce system can respond quickly to regulatory induced changes simply by replacing the DLLs without impacting the higher level application software.

The electronic commerce system has another benefit in that it can be used in a complementary fashion with existing commerce systems, such as the credit card payment card authorization and settlement system, that are already in place today.

In compliance with the statute, the invention has been described in language more or less specific as to structure and method features. It is to be understood, however, that the invention is not limited to the specific features described, since the means herein disclosed comprise exemplary forms of putting the invention into effect. The invention is, therefore, claimed in any of its forms or modifications within the proper scope of the appended claims appropriately interpreted in accordance with the doctrine of equivalents and other applicable judicial doctrines.

What is claimed is:

1. A method for conducting an electronic transaction involving at least a document related to the transaction and at least an instrument describing a mode of payment for the transaction, the method comprising:

encrypting the document and the instrument at a first participant;

sending the encrypted document and the encrypted instrument from the first participant to a second participant; and decrypting only one of the document or the instrument at the second participant;

wherein said encrypting further comprises:

supplying the document and the instrument to a cryptographic application program interface (CAPI) resident at the first participant;

selecting a cryptography service provider (CSP) for encrypting the document and the instrument;

establishing communication between the CAPI and the CSP;

verifying, at the CAPI, an authenticity of the CSP;

passing the document and the instrument from the CAPI to the CSP;

encrypting the document and the instrument at the CSP using at least one encryption key maintained by the CSP to produce an encrypted document and an encrypted instrument; and passing the encrypted document and the encrypted instrument from the CSP back to the CAPI without exposing the encryption key in its non-encrypt form.

2. A method as recited in claim 1 further comprising:

encrypting the document and the instrument at the CSP using a symmetric key;

encrypting the symmetric key with a private key from an asymmetric pair of private and public keys unique to the first participant;

passing the encrypted symmetric key to the CAPI; and retaining the asymmetric private key in confidence within the CSP.

3. A method as recited in claim 1 wherein the verifying comprises:

attaching a digital signature of a trusted credential authority to the CSP; and validating the digital signature to authenticate the CSP.

4. An electronic system comprising:

an first computing unit at a first participant;

a second computing unit at a second participant;

a third computing unit at a third participant;

at least one communication system interconnecting the first computing unit, the second computing unit, and the third computing unit;

an encryption device provided at the first computing unit to encrypt a document related to a transaction and an instrument describing a mode of payment for the transaction;

the first computing unit sending the encrypted document and the encrypted instrument over the communication system to the second computing unit at the second participant;

a first decrypting device provided at the second computing unit to decrypt one of the document or the instrument;

the second computing unit passing the other of the document or the instrument over the communication system to the third computing unit at the third participant; and a second decrypting device provided at the third computing unit to decrypt the other of the document or the instrument;

wherein communication among the first and second computing units is conducted using a tag-length-value data structure, the tag-length-value data structure comprising:

a fixed-sized identifier field to define commerce data contained in the data structure;

a variable-sized length field containing a length of the commerce data in the data structure; and a variable-sized value field containing the commerce data.

5. An interactive television system incorporating an electronic system as recited in claim 4.

6. An electronic system comprising:

an originating computing unit at an originating participant;

a first recipient computing unit at a first recipient participant;

a second recipient computing unit at a second recipient participant;

at least one application executing on each of the computing units to facilitate transfer of a document related to a commerce transaction and an instrument describing a mode of payment for the commerce transaction;

each of the computing units having a cryptography system to support the application, the cryptography system comprising:

a cryptographic application program interface (CAPI) to interface with the application when the application requests encryption/decryption of the document and the instrument;

at least one cryptography service provider (CSP) dynamically accessible by the CAPI, the CSP receiving the document and the instrument from the CAPI and encrypting or decrypting the messages using encryption keys, the CSP managing and protecting the encryption keys to prevent exposure of the encryption keys in a non-encrypted form to the CAPI;

the originating computing unit using its cryptography system to encrypt the document and the instrument and then sending the encrypted document and the encrypted instrument to the first recipient computing unit at the first recipient participant;

the first recipient computing unit using its cryptography system to decrypt one of the document or the instrument;

the first recipient computing unit passing the other of the document or the instrument to the second recipient computing unit at the second recipient participant; and the second recipient computing unit using its cryptography system to decrypt the other of the document or the instrument.

7. An electronic system as recited in claim 6 wherein the CSP is digitally signed with a digital signature unique to a credential binding authority.

8. An electronic system as recited in claim 7 wherein the CAPI verifies an authenticity of the CSP by validating the digital signature of the credential binding authority.

9. An electronic system as recited in claim 6 wherein the CSP digitally signs the document and instrument with a digital signature unique to the participant and passes the signed encrypted document and the signed encrypted instrument back to the CAPI.

10. An electronic system as recited in claim 9 wherein the cryptography system further comprises a private application program interface (PAPI) to interface the CSP with the participant, the PAPI enabling the participant to confirm or reject attaching the digital signature to the document and the instrument.

11. An electronic system as recited in claim 6 wherein the CSP stores at least one unique encryption key.

12. An electronic system as recited in claim 6 wherein the CSP generates the encryption keys used to encrypt the messages.

13. An electronic system as recited in claim 6 wherein the CSP destroys the encryption keys following their use.

14. An electronic system as recited in claim 6 wherein the CSP assigns handles to the encryption keys, the handles being made available to the application through the CAPI, but the encryption keys remaining hidden from the application and the CAPI.

15. An electronic system as recited in claim 6 wherein the CSP is implemented in software as a dynamically linked library which is executable on the computing units.

16. An electronic system as recited in claim 6 wherein the cryptography system further comprises a private application program interface (PAPI) to interface the CSP with the participant, the PAPI presenting an explanation of the document and the instrument to the participant.

17. An electronic system as recited in claim 6 wherein the cryptography system further comprises a private application program interface (PAPI) to interface the CSP with the participant, the PAPI verifying an authenticity of the participant prior to enabling access to the application through the CSP.

18. An electronic system as recited in claim 6 wherein the cryptography system is implemented as a service layer for an operating system on which the application runs, further comprising an application program interface (API) to the cryptography system.

19. An electronic system as recited in claim 18 wherein the originating participant is a consumer and the API is a consumer API constructed for the consumer, the application being configured to communicate with the consumer API to request at least one task selected from a group comprising:

creating a registration credential;

processing a credential registration response;

creating a transaction; and processing a transaction receipt.

20. An electronic system as recited in claim 18 wherein the first recipient participant is a merchant and the API is a merchant API constructed for the merchant, the application being configured to communicate with the merchant API to request at least one task selected from a group comprising:

creating a registration credential;

processing a credential registration response;

processing a transaction;

creating a transaction authorization request;

processing a transaction authorization response; and creating a transaction receipt.

21. An electronic system as recited in claim 18 wherein the second recipient participant is an acquirer and the API is an acquirer API constructed for the acquirer, the application being configured to communicate with the acquirer API to request at least one task selected from a group comprising: (1) creating a registration credential; (2) processing a credential registration response; (3) processing a transaction authorization request; and (4) creating a transaction authorization response.

22. An electronic system as recited in claim 18 further comprising a binder with whom the participants register, wherein the API is a binder API constructed for the binder, the application being configured to communicate with the binder API to request at least one task selected from a group comprising: (1) processing a registration credential request; and (2) creating a credential registration response.

23. A computer program product comprising:

code for encrypting a document related to a transaction and an instrument describing a mode of payment for the transaction in a manner which enables a recipient to decrypt one of the document or the instrument, but not the other of the document or the instrument;

code for sending both the encrypted document and the encrypted instrument to the recipient; and a computer readable storage medium for holding the codes.

24. A computer program product as recited in claim 23, further comprising:

code for signing the document and the instrument with a digital signature.

25. A computer program product comprising:

code for receiving an encrypted document related to a transaction and an encrypted instrument describing a mode of payment for the transaction from an originator;

code for decrypting one of the document or the instrument, but not the other of the document or the instrument;

code for sending the other of the document or the instrument in encrypted form to another party; and a computer readable storage medium for holding the codes.

26. For execution in an electronic system having multiple computing units interconnected by a network, a computer program product having computer-executable instructions for execution at the computing units, said product comprising:

code for encrypting, at an originating computing unit, a document related to a transaction and an instrument describing a mode of payment for the transaction in a manner which enables a first recipient computing unit to decrypt one of the document or the instrument and a second recipient computing unit to decrypt the other of the document or the instrument;

code for sending the encrypted document and the encrypted instrument from the originating computing unit to the first recipient computing unit;

code for decrypting, at the first recipient computing unit, said one of the document or the instrument;

code for sending the other of the document or the instrument from the first recipient computing unit onto the second recipient computing unit;

code for decrypting, at the second recipient computing unit, said other of the document or the instrument; and a computer readable storage medium for holding the codes.

* * * * *